US012646306B2

(12) United States Patent
Huang et al.

(10) Patent No.: US 12,646,306 B2
(45) Date of Patent: Jun. 2, 2026

(54) JOINT 3D DETECTION AND SEGMENTATION USING BIRD'S EYE VIEW AND PERSPECTIVE VIEW

(71) Applicant: TuSimple, Inc., San Diego, CA (US)

(72) Inventors: Zhe Huang, San Diego, CA (US); Lingting Ge, San Diego, CA (US); Yizhe Zhao, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 436 days.

(21) Appl. No.: 18/475,988

(22) Filed: Sep. 27, 2023

(65) Prior Publication Data

US 2025/0054286 A1     Feb. 13, 2025

Related U.S. Application Data

(60) Provisional application No. 63/518,084, filed on Aug. 7, 2023.

(51) Int. Cl.
*G06V 10/80* (2022.01)
*G06V 10/77* (2022.01)
*G06V 20/58* (2022.01)

(52) U.S. Cl.
CPC ........ *G06V 10/806* (2022.01); *G06V 10/7715* (2022.01); *G06V 20/58* (2022.01)

(58) Field of Classification Search
CPC .. G06V 10/806; G06V 10/7715; G06V 10/82; G06V 20/58; G06V 20/56; G06F 18/253
See application file for complete search history.

(56) References Cited

U.S. PATENT DOCUMENTS

| | | | | |
|---|---|---|---|---|
| 11,494,937 B2 * | 11/2022 | Urtasun | .................. | G01S 17/86 |
| 2023/0260266 A1 * | 8/2023 | Karasev | ................ | G01S 13/931 |
| | | | | 382/104 |
| 2025/0029355 A1 * | 1/2025 | Balachandran | ....... | G06F 18/253 |

FOREIGN PATENT DOCUMENTS

| | | | | | |
|---|---|---|---|---|---|
| CN | 113435232 A | * | 9/2021 | .......... | G06F 18/253 |
| CN | 116168384 A | * | 5/2023 | ............. | G06V 20/64 |
| CN | 116363615 A | * | 6/2023 | ............. | G06V 20/56 |

OTHER PUBLICATIONS

Yang, Chenyu, Yuntao Chen, Hao Tian, Chenxin Tao, Xizhou Zhu, Zhaoxiang Zhang, Gao Huang et al. "BEVFormer v2: Adapting Modern Image Backbones to Bird's-Eye-View Recognition via Perspective Supervision." arXiv preprint arXiv:2211.10439 (2022). (Year: 2022).*
Li, Jing, Rui Li, Jiehao Li, Junzheng Wang, Qingbin Wu, and Xu Liu. "Dual-view 3d object recognition and detection via lidar point cloud and camera image." Robotics and Autonomous Systems 150 (2022): 103999. (Year: 2022).*

(Continued)

*Primary Examiner* — Carol W Chan
(74) *Attorney, Agent, or Firm* — Perkins Coie LLP

(57) ABSTRACT

An image processing method includes performing, using images obtained from one or more sensors onboard a vehicle, a 2-dimensional (2D) feature extraction; performing, a 3-dimensional (3D) feature extraction on the images; detecting objects in the images by fusing detection results from the 2D feature extraction and the 3D feature extraction.

18 Claims, 20 Drawing Sheets

(56) References Cited

OTHER PUBLICATIONS

Ku, Jason, Melissa Mozifian, Jungwook Lee, Ali Harakeh, and Steven L. Waslander. "Joint 3d proposal generation and object detection from view aggregation." In 2018 IEEE/RSJ international conference on intelligent robots and systems (IROS), pp. 1-8. IEEE, 2018. (Year: 2018).*

Chen, Yun, Bin Yang, Ming Liang, and Raquel Urtasun. "Learning joint 2d-3d representations for depth completion." In Proceedings of the IEEE/CVF International Conference on Computer Vision, pp. 10023-10032. 2019. (Year: 2019).*

Liu, Yingfei, Junjie Yan, Fan Jia, Shuailin Li, Aqi Gao, Tiancai Wang, and Xiangyu Zhang. "Petrv2: A unified framework for 3d perception from multi-camera images." In Proceedings of the IEEE/CVF international conference on computer vision, pp. 3262-3272. 2023. (Year: 2023).*

Jonah Philon, et al. "Lift, splat, shoot: Encoding images from arbitrary camera rigs by implicitly unprojecting to 3d" In European Conference on Computer Vision, pp. 194-210. Springer, [2022].

Yue Wang, et al. "Detr3d: 3d object detection from multi-view images via 3d-to-2d queries" In In Conference on Robot Learning, [2022], (12 pages).

Yinhao Li, et al. "BEVDepth: Acquisition of Reliable Depth for Multi-View 3D Object Detection" Proceedings of the AAAI Conference on Artificial Intelligence, 37(2): 1477-1485 [2023].

Xuewu Lin, et al. "Sparse4D: Multi-view 3D Object Detection with Sparse Spatial-Temporal Fusion" arXiv preprint arXiv:2211. 10581v2, [Feb. 10, 2023], (10 pages).

Adam W. Harley, et al. "Simple-BEV: What Really Matters for Multi-Sensor BEV Perception?" In IEEE International Conference on Robotics and Automation (ICRA) [Sep. 29, 2022], (7 pages).

Enze Xie, et al. "M2BEV: Multi-Camera Joint 3D Detection and Segmentation with Unified Birds-Eye View Representation" arXiv:2204. 05088 [2022], (21 pages).

Zhiqi Li, et al. "BEVFormer: Learning Bird's-Eye-View Representation from Multi-Camera Images via Spatiotem poral Transformers" arXiv:2203.17270v2, [Jul. 13, 2022] (20 pages).

Junjie Huang, et al. "BEVDet4D: Exploit Temporal Cues in Multi-camera 3D Object Detection" arXiv:2203.17054v3 [Jun. 16, 2022], (11 pages).

Junjie Huang, et al. "BEVDet:High-performance Multi-camera 3D Object Detection in Bird-Eye-View" arXiv:2112.11790v3 [Jun. 16, 2022], (19 pages).

* cited by examiner

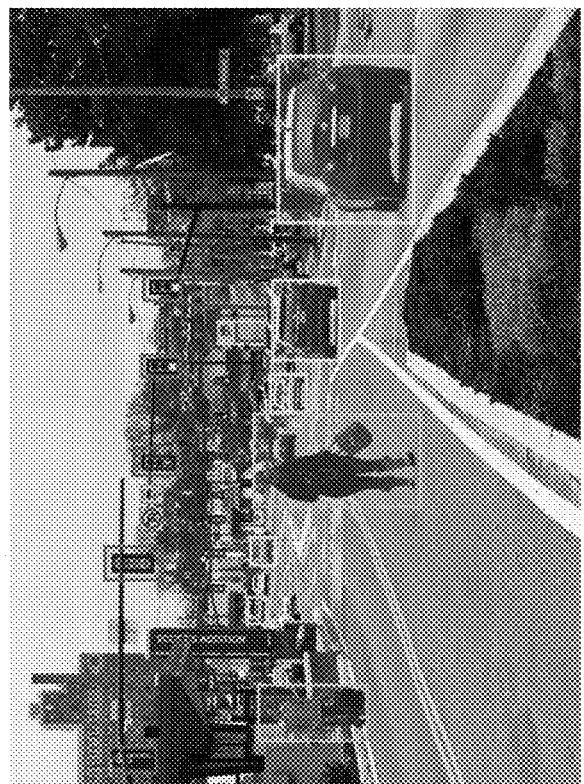
FIG. 1

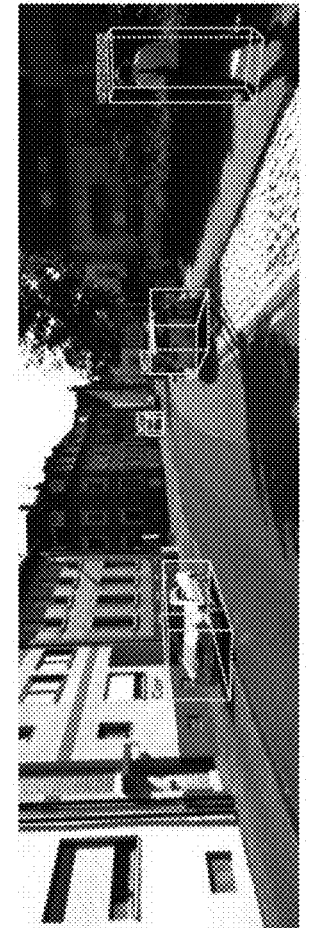
FIG. 2

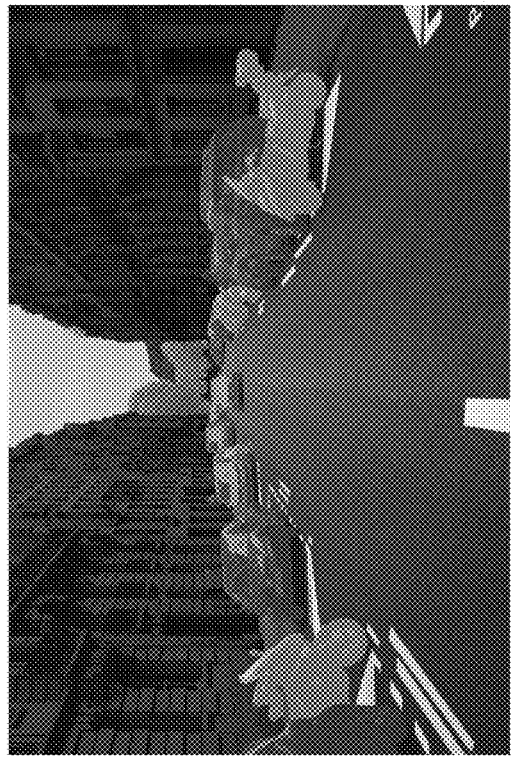
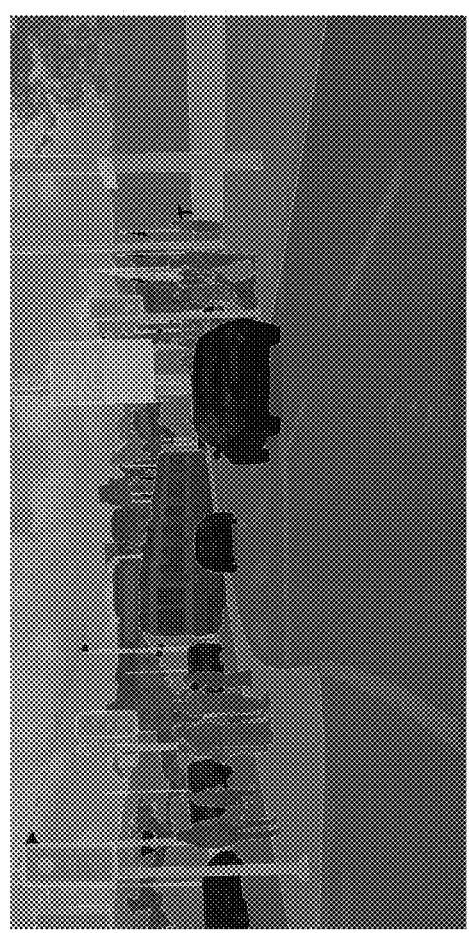
FIG. 3

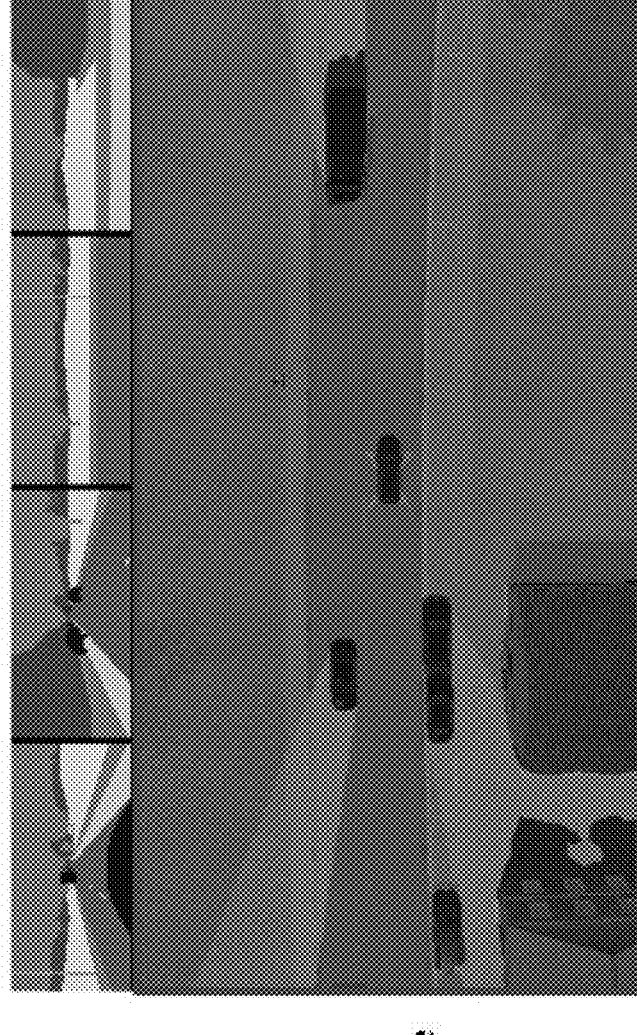
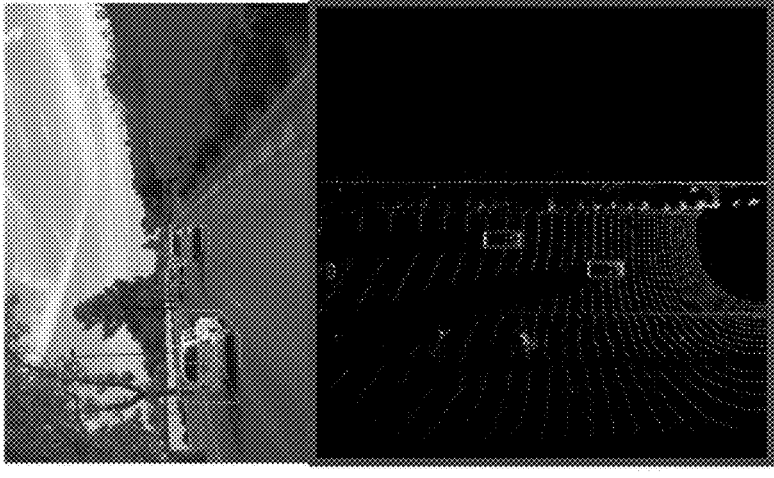
PV Space
BEV Space
FIG. 6

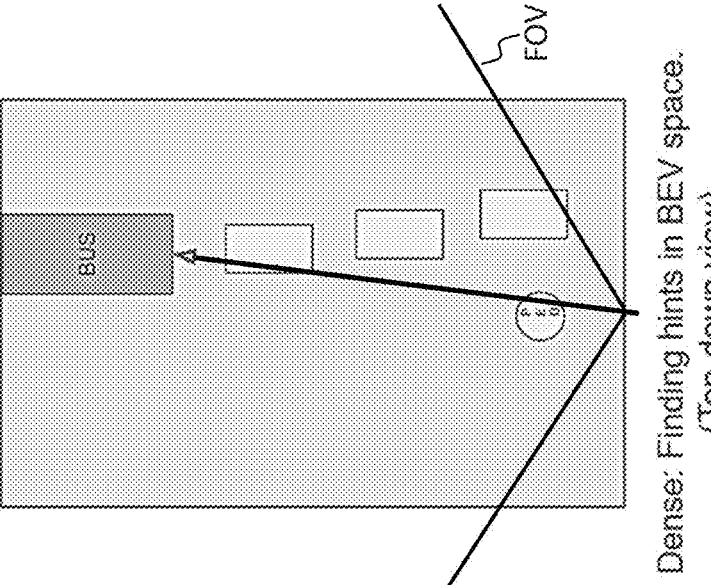
FOV
Dense: Finding hints in BEV space.
(Top-down view)
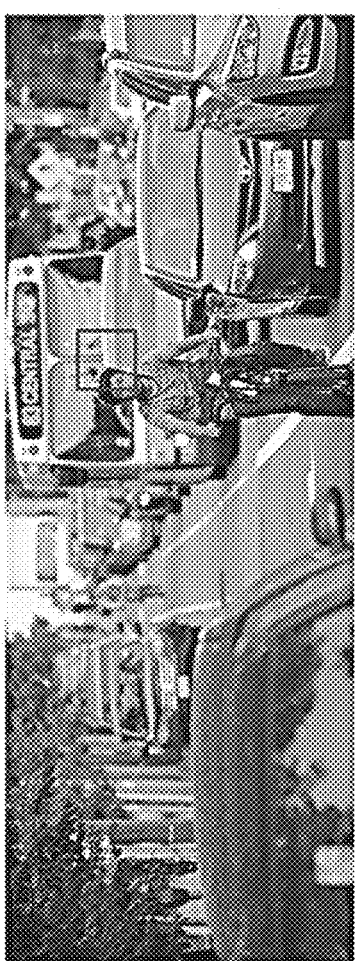
Sparse: Finding hints in PV space.
(□ denotes a proposal.)
FIG. 7B

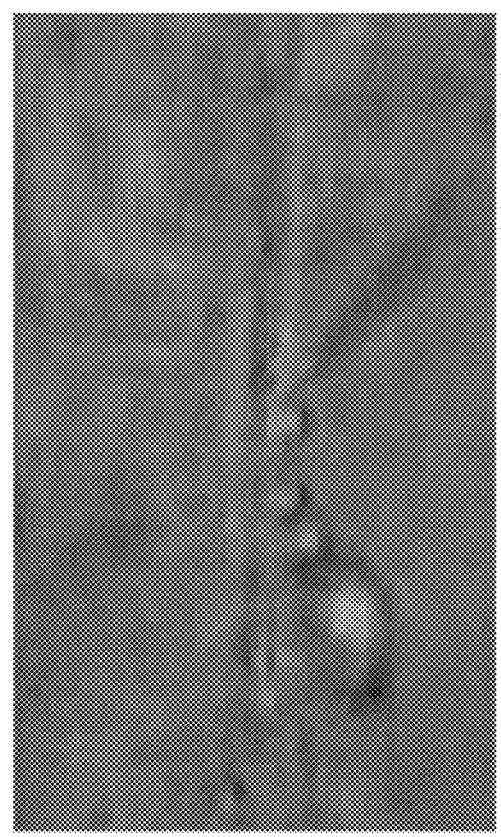
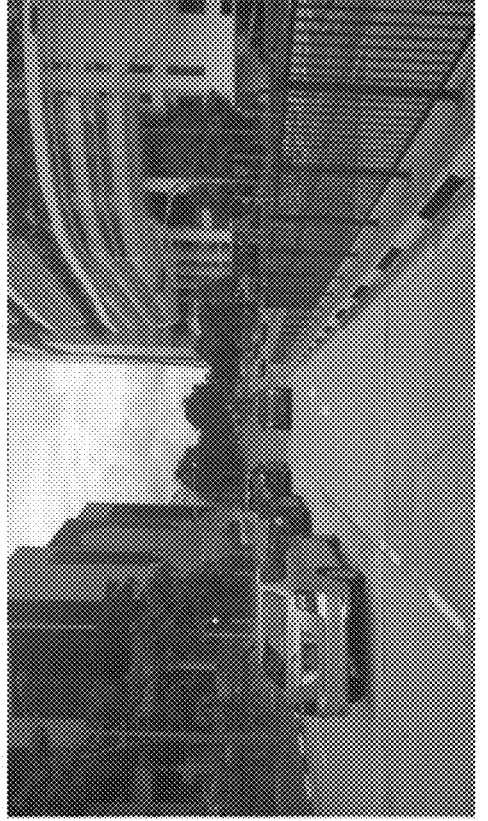
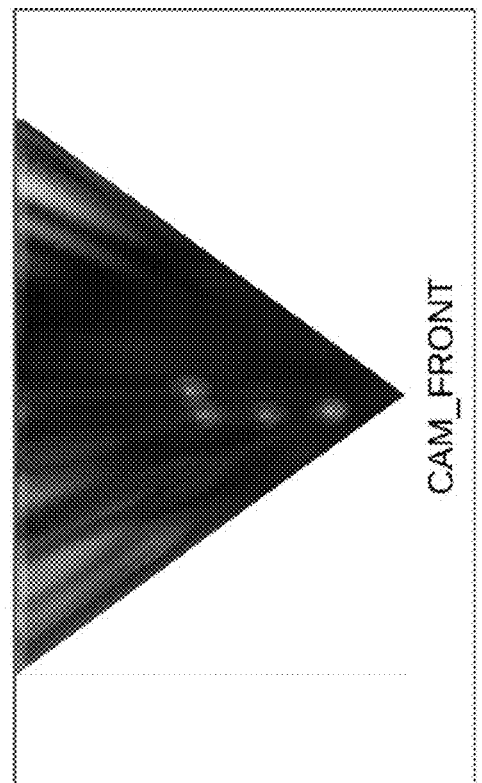
CAM_FRONT
FIG. 8

Figure 14:
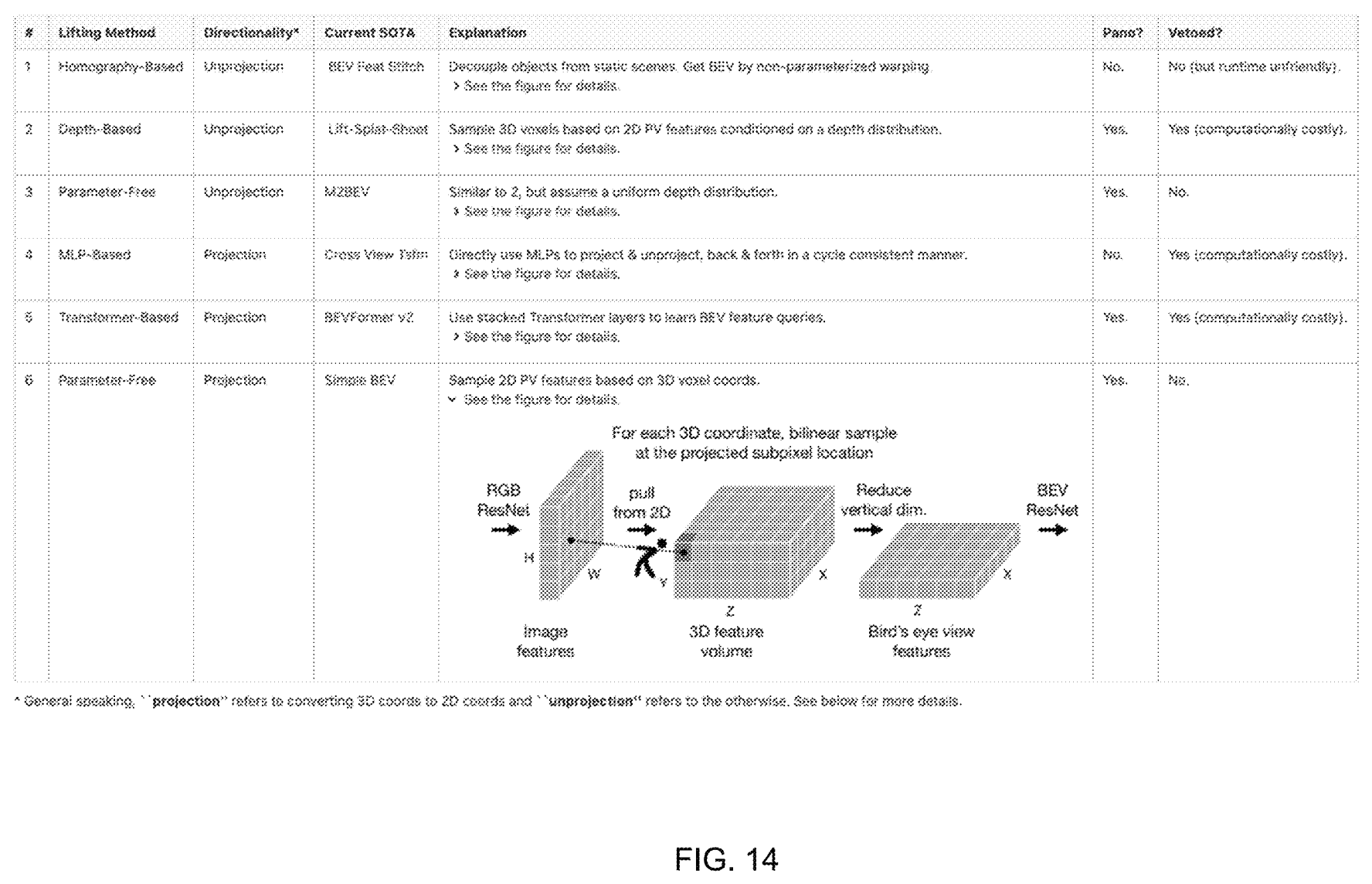

| # | Lifting Method* | Directionality* | Current SOTA | Explanation | Param? | Vetoed? |
|---|---|---|---|---|---|---|
| 1 | Homography-Based | Unprojection | BEV Feat Stitch | Desample objects from static scenes. Get BEV by non-parameterized warping. > See the figure for details. | No. | No (but runtime unfriendly). |
| 2 | Depth-Based | Unprojection | Lift-Splat-Shoot | Sample 3D voxels based on 2D PV features conditioned on a depth distribution. > See the figure for details. | Yes. | Yes (computationally costly). |
| 3 | Parameter-Free | Unprojection | M2BEV | Similar to 2, but assume a uniform depth distribution. > See the figure for details. | Yes. | No. |
| 4 | MLP-Based | Projection | Cross View Tstm | Directly use MLPs to project & unproject, back & forth in a cycle consistent manner. > See the figure for details. | No. | Yes (computationally costly). |
| 5 | Transformer-Based | Projection | BEVFormer v2 | Use stacked Transformer layers to learn BEV feature queries. > See the figure for details. | Yes. | Yes (computationally costly). |
| 6 | Parameter-Free | Projection | Simple BEV | Sample 2D PV features based on 3D voxel coords. > See the figure for details. | Yes. | No. |

\* General speaking, "projection" refers to converting 3D coords to 2D coords and "unprojection" refers to the otherwise. See below for more details.

For each 3D coordinate, bilinear sample at the projected subpixel location

RGB ResNet — Image features — pull from 3D — 3D feature volume — Reduce vertical dim. — Bird's eye view features — BEV ResNet

1702 performing, using images obtained from one or more sensors onboard a vehicle, a 2-dimensional (2D) feature extraction;

1704 performing, a 3-dimensional (3D) feature extraction on the images

1702 detecting objects in the images by fusing detection results from the 2D feature extraction and the 3D feature extraction

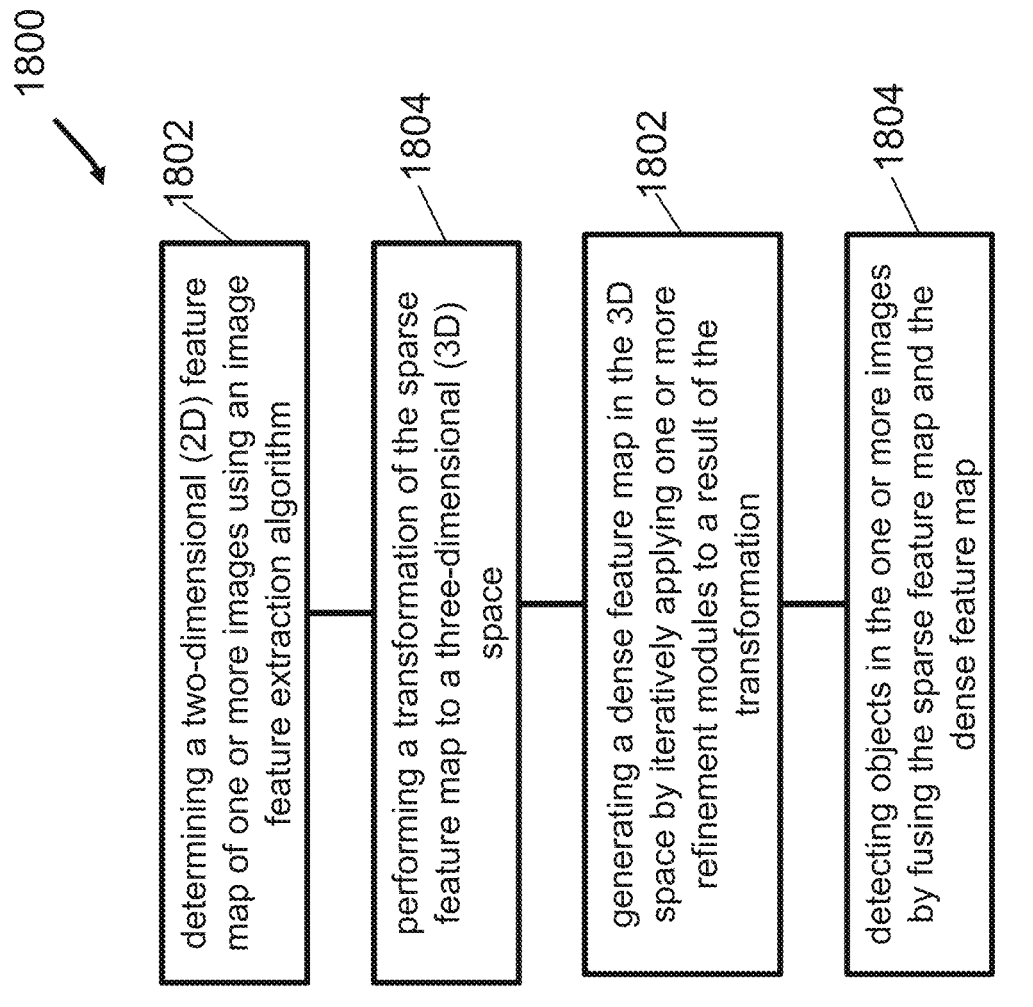

1800

1802
determining a two-dimensional (2D) feature map of one or more images using an image feature extraction algorithm 1804
performing a transformation of the sparse feature map to a three-dimensional (3D) space 1802
generating a dense feature map in the 3D space by iteratively applying one or more refinement modules to a result of the transformation 1804
detecting objects in the one or more images by fusing the sparse feature map and the dense feature map

FIG. 18

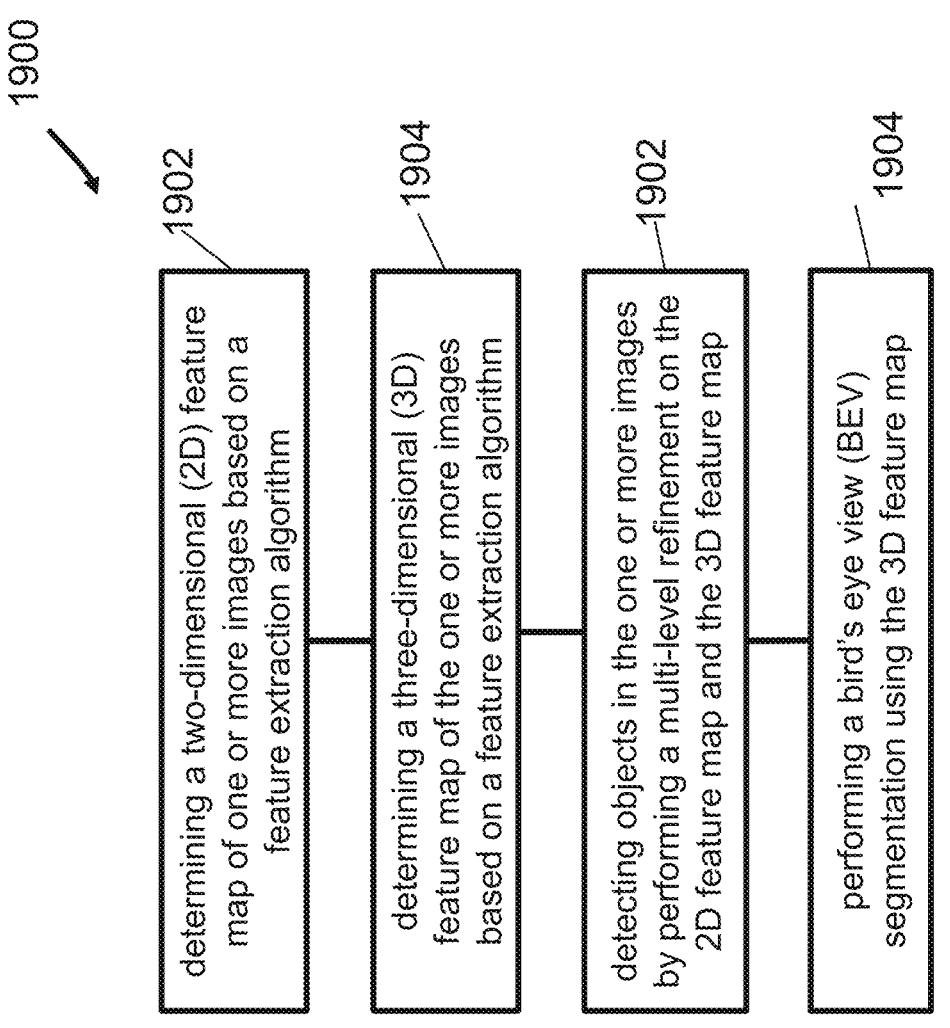

1900

1902 determining a two-dimensional (2D) feature map of one or more images based on a feature extraction algorithm

1904 determining a three-dimensional (3D) feature map of the one or more images based on a feature extraction algorithm

1902 detecting objects in the one or more images by performing a multi-level refinement on the 2D feature map and the 3D feature map

1904 performing a bird's eye view (BEV) segmentation using the 3D feature map

FIG. 19

JOINT 3D DETECTION AND SEGMENTATION USING BIRD'S EYE VIEW AND PERSPECTIVE VIEW

CROSS-REFERENCE TO RELATED APPLICATIONS

This patent application claims priority to and the benefit of U.S. Provisional Application No. 63/518,084, filed on Aug. 7, 2023. The aforementioned application of which is incorporated herein by reference in its entirety.

TECHNICAL FIELD

This document relates to tools (systems, apparatuses, methodologies, computer program products, etc.) for image processing, and more particularly, processing images received by sensors of a semi-autonomous or autonomous vehicle.

BACKGROUND

Awareness of a vehicle to surrounding objects can serve an important purpose of safe driving and may also help improve fuel efficiency. A vehicle may be configured with one or more sensors that capture images or point cloud data of surrounding environment from which the surrounding objects can be identified.

SUMMARY

Disclosed are devices, systems and methods for analyzing images to identify objects located in the images. In one aspect, the object identification may be used for navigation of a self-driving vehicle.

In one aspect, an image processing method is disclosed. The method includes performing, using images obtained from one or more sensors onboard a vehicle, a 2-dimensional (2D) feature extraction; performing, a 3-dimensional (3D) feature extraction on the images; and detecting objects in the images by fusing detection results from the 2D feature extraction and the 3D feature extraction In another aspect, another method is disclosed. The method includes determining a two-dimensional (2D) feature map of one or more images using an image feature extraction algorithm; performing a transformation of the sparse feature map to a three-dimensional (3D) space; generating a dense feature map in the 3D space by iteratively applying one or more refinement modules to a result of the transformation; and detecting objects in the one or more images by fusing the sparse feature map and the dense feature map In yet another aspect, another method is disclosed. The method includes determining a two-dimensional (2D) feature map of one or more images based on a feature extraction algorithm; determining a three-dimensional (3D) feature map of the one or more images based on a feature extraction algorithm; detecting objects in the one or more images by performing a multi-level refinement on the 2D feature map and the 3D feature map such that, at each level, one or more object proposals are used for object detection, wherein each object proposal comprises a first part corresponding to an anchor point that is shared between the 2D feature map and the 3D feature map, a part that is specific to the 2D feature map and a third part that is specific to the 3D feature map; and performing a bird's eye view (BEV) segmentation using the 3D feature map.

In another exemplary aspect, the above-described method is embodied in a non-transitory computer readable storage medium. The non-transitory computer readable storage medium includes code that when executed by a processor, causes the processor to perform the methods described in this patent document.

In yet another exemplary embodiment, a device that is configured or operable to perform the above-described methods is disclosed.

The above and other aspects and features of the disclosed technology are described in greater detail in the drawings, the description and the claims.

BRIEF DESCRIPTION OF THE DRAWINGS

FIG. 1 shows an example use of bounding boxes for object identification.

FIG. 2 shows an example of use of 3D bounding boxes for object identification.

FIG. 3 shows an example of image segmentation.

FIG. 6 shows an example of a BEV segmentation and detection.

FIG. 7B depicts an example comparison of a sparse and a dense feature detection method.

FIG. 8 shows an example of a camera image.

FIG. 14 depicts various algorithms for view transformation.

FIGS. 17 to 19 depict flowcharts of example methods of object detection.

DETAILED DESCRIPTION

Figure 4:
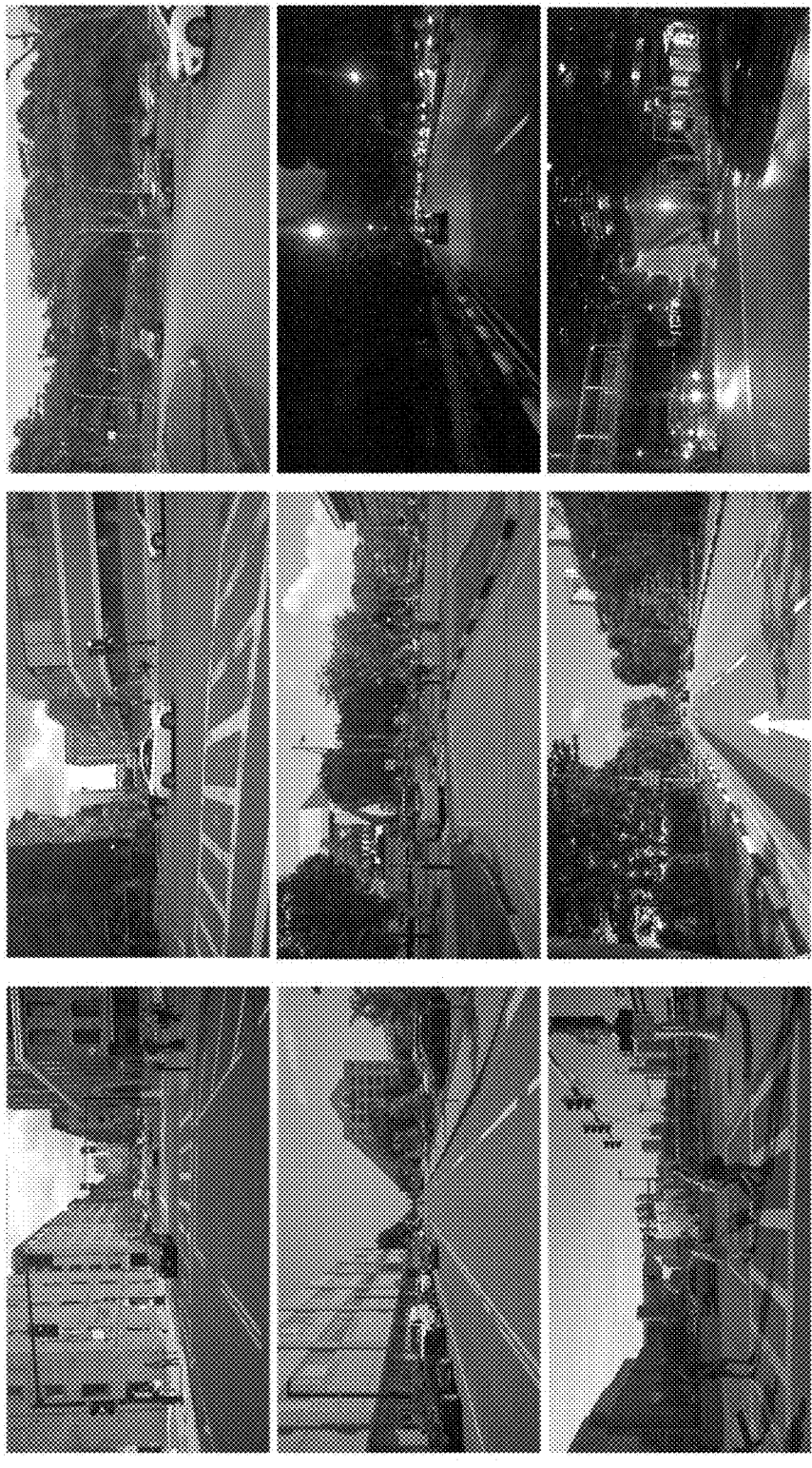
FIG. 4 shows an example of a perspective view (PV) of a scene.

Section headings are used in the present document for ease of cross-referencing and improving readability and do not limit scope of disclosed techniques. Furthermore, various image processing techniques have been described by using examples of self-driving vehicle platform as an illustrative example, and it would be understood by one of skill in the art that the disclosed techniques may be used in other operational scenarios also.

The transportation industry has been undergoing considerable changes in the way technology is used to control vehicles. A semi-autonomous and autonomous vehicle is provided with a sensor system including various types of sensors to enable a vehicle to operate in a partially or fully autonomous mode. In order to safely and efficiently navigate on roadways, the autonomous vehicle should be able to discern nearby objects—such as pedestrians, other vehicles, traffic signals, landscape objects and so on. To enable object detection by a vehicle, sensors (e.g., lidar sensors) and cameras may be installed on the vehicle.

Recent advances in camera-only 3D detection either rely on an accurate reconstruction of bird's-eye-view (BEV) 3D features or on traditional 2D perspective view (PV) image features. While both have their own pros and cons, few have found a way to stitch them together in order to benefit from "the best of both worlds." In this patent document, we disclose some unique fusion strategies which allow effective aggregation of the two feature representations. Our proposed method is the first to leverage two distinct feature spaces and achieves the state-of-the-art 3D detection & segmentation results on nuScenes dataset, which is a large publicly available dataset for autonomous driving research and development.

1. Object Detection in Autonomous Driving 3D detection & segmentation via multi-view images undergoes active research due to its usefulness for applications such as autonomous driving. While there are many LiDAR-based 3D detection & segmentation methods may be possible, camera-only methods still have their unique advantages. For example, camera-only perception systems are generally low-complexity, cost-friendly to deploy and have a higher resolution for distant objects.

Despite the popularity and interests vested in 3D detection tasks, most existing methods fall into one of the following two categories: bird's-eye-view-based (BEV-based) methods or perspective-view-based (PV-based) methods.

FIG. 1 shows an example of road views seen by an autonomous vehicle. In some implementations, the vehicle may use bounding boxes for object identification. Two images corresponding to two street views are depicted. Examples of two-dimensional (2D) bounding boxes drawn around objects such as pedestrians, traffic signals, other cars and animals in the street. Bounding boxes may be square, rectangular (as depicted) or as having any suitable other shape. A vehicle may first detect objects and put bounding boxes around the places where it detects objects.

FIG. 2 shows an example of use of 3D bounding boxes for object identification. Three examples street views are depicted with corresponding three-dimensional bounding boxes. For each detected object, a 3D bounding box may be predicted along with class attributes. Other parameters that define the 3D bounding box include 3D localization prediction (e.g., lateral, depth, altitude, e.g. [5 m, 47 m, −0.5 m], size prediction (length, width, height), orientation prediction (heading) and velocity prediction (Vx, Vy, Vz).

FIG. 3 shows two examples of image segmentation performed on a frame of a street view. For each pixel in the image, a class attribute(s) may be attached such as road surface, vegetation, lane marking, pedestrian, etc. Image segmentation may be performed using 2D attributes.

FIG. 4 shows nine examples of perspective views (PV) of road scenes. These images represent images in a 2D view as may be perceived by a human driver. These scenes show the complexity of a typical street scene in which many different objects may be present at different distances from the camera or lidar sensor of a vehicle.

Figure 5:
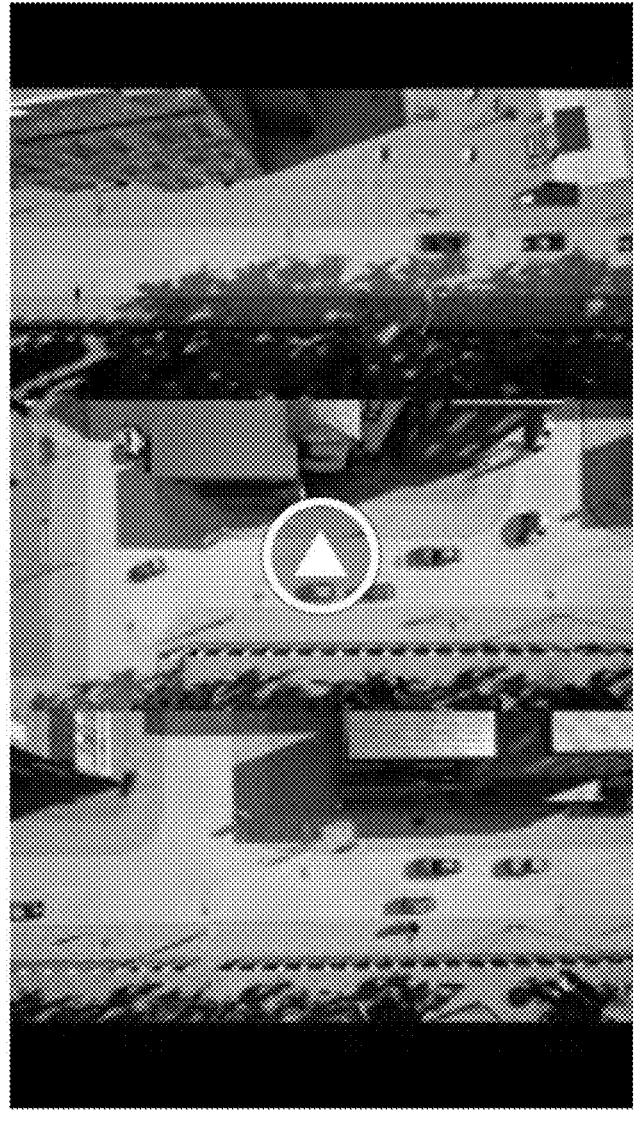
FIG. 5 shows an example of a bird's eye view (BEV) of a scene.

FIG. 5 shows an example of a bird's eye view (BEV) of a scene. In this view, environment around a vehicle may be seen in a top-down manner, e.g., as would be seen by a bird or a drone flying overhead the vehicle. Different from the PV, in BEV, object distances may become more obvious.

FIG. 6 shows an example to highlight a comparison between PV segmentation and detection and a BEV segmentation and detection. Here, two examples are shown, first for processing in the PV space and the second for processing in the BV space. In both examples, the top window shows detection and segmentation in PV space, while the bottom window shows detection and segmentation in BEV space.

Figure 7A:
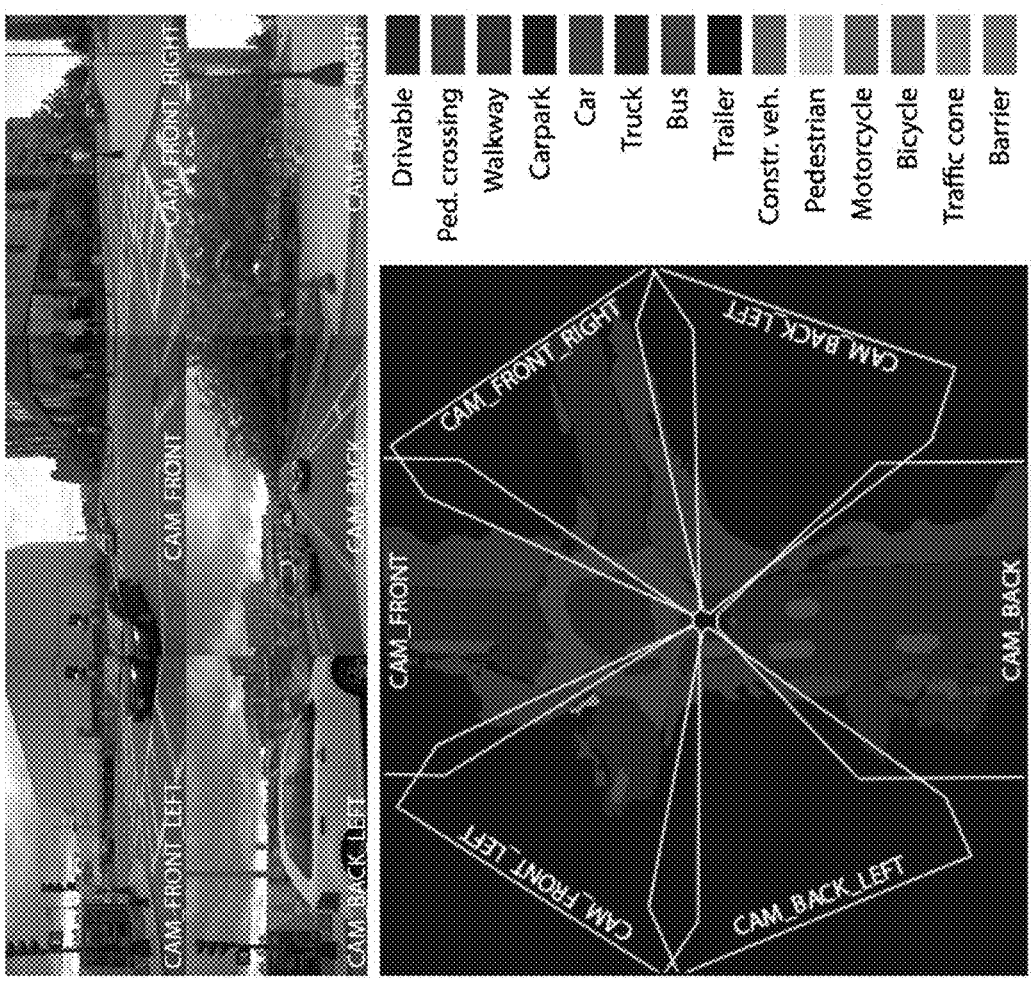
FIG. 7A shows an example of multi-camera BEV.

FIG. 7A shows an example of multi-camera BEV (six cameras are used in this example). This example highlights the usefulness of BEV in providing object detection results that are more suitable for vehicle navigation. For example, self-driving vehicles may not care about heights of obstacles (more clearly seen in PV). Furthermore, BEV offers the opportunity to perform multi-sensor fusion, providing more robust data. BEV also allows easier temporal aggregation using sequential video inputs because image scenery typically changes at a slower rate. Furthermore, BEV typically is less dependent on sensor pose of sensors disposed on a self-driving vehicle.

FIG. 7B depicts an example comparison of a sparse and a dense feature detection method. The picture on let shows an example of a sparse detection algorithm that finds hints in the PV space. The small square in the middle denotes a proposal. On the right, a dense implementation that finds hints n BV space is shown. It can be appreciated that different objects that occlude each other in PV are relatively easily detectable in the BEV view.

2. BEV-Based Multi-View 3D Perception

Tackling multi-view 3D object detection task by bird's-eye-view (BEV) representations has been a popular trend in autonomous driving industry. Following LSS, BEVDet and BEVDepth unproject 2D image features into an explicit BEV feature map using dense depth predictions. M²BEV and Simple-BEV improve the efficiency of 2D to 3D BEV transformation by assuming a uniform distribution of depths when doing camera back-projection. Surprisingly, BEV-based methods can work without the non-trivial dense depth estimation. BEVFormer and BEVFormer v2 model dense BEV feature map with per-dataset level queries optimized via deformable attention. BEVFormer v2 also adds a perspective 3D detection head as an auxiliary task. Going on, most recent BEV-based 3D detection methods shift their endeavors to improve temporal designs rather than fundamentals of BEV feature representations.

Another focus of BEV-based 3D perception is to handle the map segmentation task. Early works tend to treat it as an individual task, while recent works, such as M2BEV and BEVFormer, explore the potential of jointly tackling object detection and map segmentation tasks by multi-task learning, which are most relevant to our approach.

3. PV-Based Multi-View 3D Perception

Starting with DETR3D, the landscape of multi-view perspective-view-based (PV-based) 3D object detection leans towards sparse query refinement with set-to-set matching loss. PETR improves transformer-based detection decoders with 3D position-aware image features. Recently, Sparse4D further extends this track with the introduction of 4D anchors, allowing intuitive ego-motion and object motion compensation. Some embodiments also focus on improving temporal modeling techniques by explicit instance temporal propagation.

While both BEV-based methods and PV-based methods seem to work well, some of their shortcomings are outstanding. On the one hand, during the feature lifting process of BEV-based methods, subtle visual cues might be lost due to coarse grid granularity, downsampling or interpolation. On the other hand, PV-based methods seem to push the efficiency to the limit for 3D object detection. However, they lack certain functionalities or extensibilities such as handling map segmentation as well as multi-modal inputs. Last but not least, while PV-based methods maintain feature quality by directly operating on PV features, this also implies that they might encounter difficulties that other PV perception tasks (e.g., 2D object detection) typically have, such as overlapping objects.

For camera-only 3D detection methods, another key observation we have is that even though BEV and PV features are originated from same images, as illustrated in FIG. 8, they barely share any resemblance. In this example, the PV feature map (top left and top right) is noticeably denser and richer in semantic information whereas the BEV feature map mainly maintains sparse spatial locality information (bottom frame). As a result, it is apparently more difficult to retrieve 3D spatial clues from the PV than the BEV feature map. Moreover, being a perspective, the PV feature map suffers greatly from occlusion problems, whereas we can have an unobstructed view of objects in the BEV space. It is also worth noting that BEV feature maps often contain pervasive camera ray-like artifacts due to the nature of back-projection, whereas PV features are free from this issue and are less noisy. This can be seen from the angular footprint of the BEV image map.

Based on the above reasonings, it looks like somehow BEV-based and PV-based methods are rather complementary. In order to bridge the gap between current BEV-based and PV-based frameworks to preserve "the best of both worlds", in this document, a new technique, also referred to as DuoSpaceNet is disclosed. This technique presents a new paradigm that jointly tackles 3D object detection and map segmentation tasks via both BEV and PV feature representations is disclosed. In one aspect, both PV features and BEV features are retained and fed into our DuoSpace Decoder that makes up a part of the DuoSpaceNet. For example, a decoder may use a transformer decoder used in Deformable Detection Transformer (DETR), for object detection. In this decoder, a small set of key sampling points around a reference is used based on a multi-scale feature map.

In the proposed technique, to maintain the uniqueness of each feature space while creating a unified representation for every 3D object, each object query is composed of a duo-space content embedding from both PV and BEV space, alongside a shared pose embedding that represents its real-world 3D pose. The decoder incorporates partial cross-attention layers to refine the duo-space content embedding using features from their respective spaces. To maximize the distinctiveness between BEV and PV features, feature divergence enhancement is introduced as the finishing touch of our BEV feature generation process. A temporal version of DuoSpaceNet is also established to show our framework's adaptability from single to multiple frames. For map segmentation, a U-Net like structure and convolution-based segmentation heads may be used after BEV feature generation, and each map category may be predicted separately.

The advantageous aspects of the proposed scheme include:

A. The technique is first to identify and address the complementary nature of feature modeling in bird's-eye-view (BEV) space and perspective view (PV)

space. Our proposed model, namely DuoSpaceNet, is the first approach to perform 3D detection based on a unique multi-feature-space paradigm.

B. The duo-space framework includes 1) duo space query along with partial cross-attention layers, 2) divergence feature enhancement to increase cross space disparity and 3) a unified temporal modeling method for both PV and BEV space.

C. On nuScenes dataset, extensive experiments and ablation studies have verified the performance and effectiveness of our proposed ideas. We are able to demonstrate that DuoSpaceNet achieves the state-of-the-art results on both 3D object detection and map segmentation benchmarks, as well as the necessity of each variation embodiments.

Figure 9:
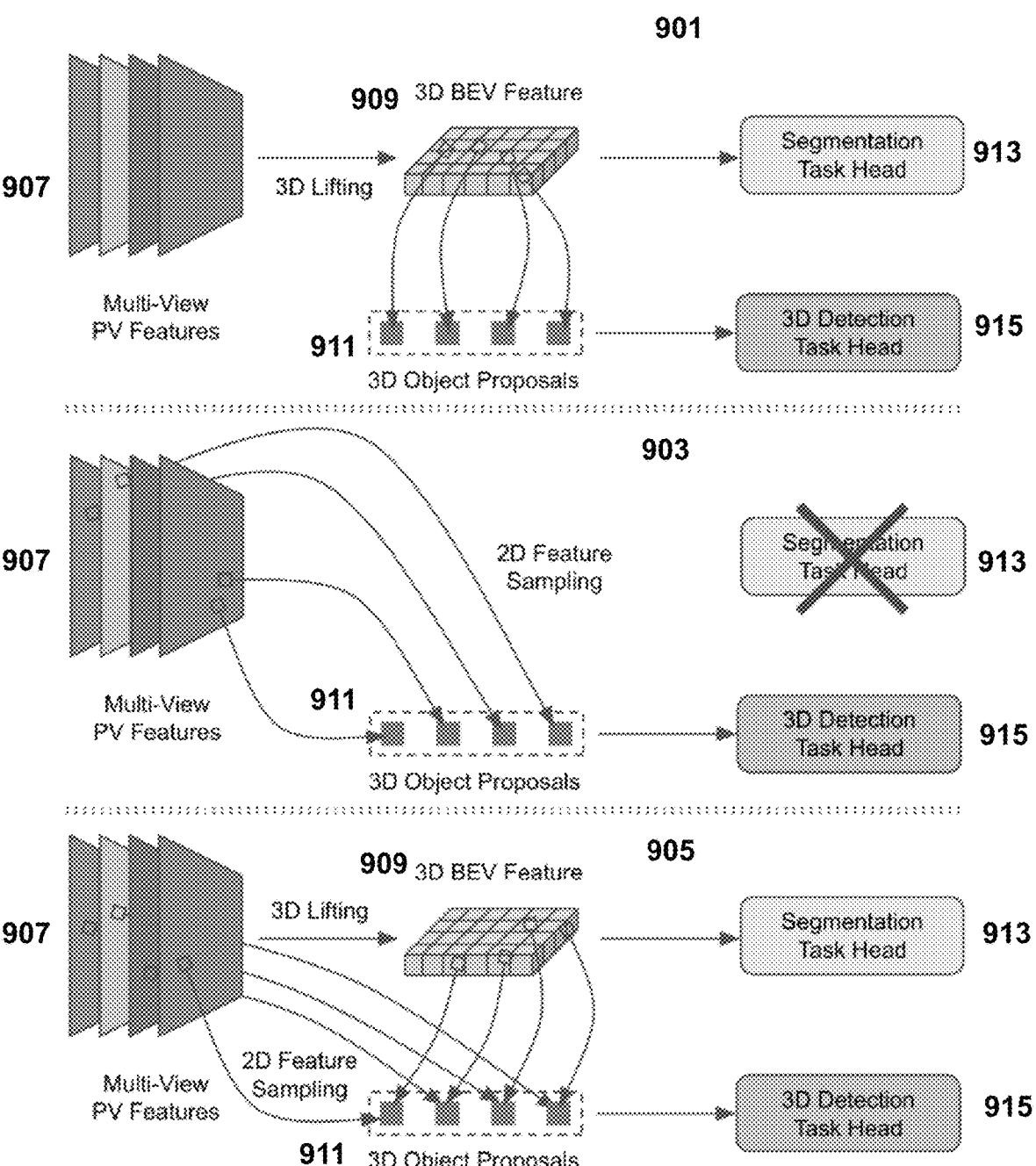
FIG. 9 is a comparison of different object detection methods.

FIG. 9 is a pictorial representation of a comparison of different object detection methods. The top workflow (901) shows the use of 3D BEV features (909) to generate 3D object proposals (11), that are used to drive segmentation (913) and 3D detection (915). Such a workflow may be a dense workflow, e.g., as discussed with respect to FIG. 8.

The middle workflow 903 shows the use of PV features (907) to generate 3D object proposals (911), thus skipping the segmentation task. Such a workflow may be a sparse workflow.

The bottom workflow (909), according to some preferred embodiments, shows the use of 3D lifting to generate 3D BEV features (909). Here, 3D object proposals (911) are generated using 2D feature sampling and 3D BEV features in combination. The proposals are then used for 3D detection and segmentation tasks (913, 915).

As depicted in FIG. 9, BEV-based methods (e.g., workflow 905) spend great efforts on generating a BEV feature map via a 2D to 3D lifting strategy, usually based on camera projection or unprojection model. Each element in the BEV feature map corresponds to the feature of a mapped 3D location. Subsequent detection and segmentation tasks are performed directly on BEV feature space. PV-based 3D detection methods, however, do not seek a full 3D BEV representation but directly build their detection heads on top of 2D image features. These methods generally utilize a limited number of sparse detection proposals, often in the hundreds. Consequently, they only need sparse visual clues at locations where the proposals are anchored at. The workflow then directly queries such clues from PV image features, making the process more computationally efficient.

The proposed DuoSpaceNet technique, further described in the present document, provides such above-discussed computational efficiency by combining PV and BEV features. In autonomous driving application, this technique may be implemented by one or more processors that are disposed on an autonomous vehicle. Some example embodiments of an autonomous vehicle are described in the next section.

4. Example Vehicular Computational Platform

Figure 10:
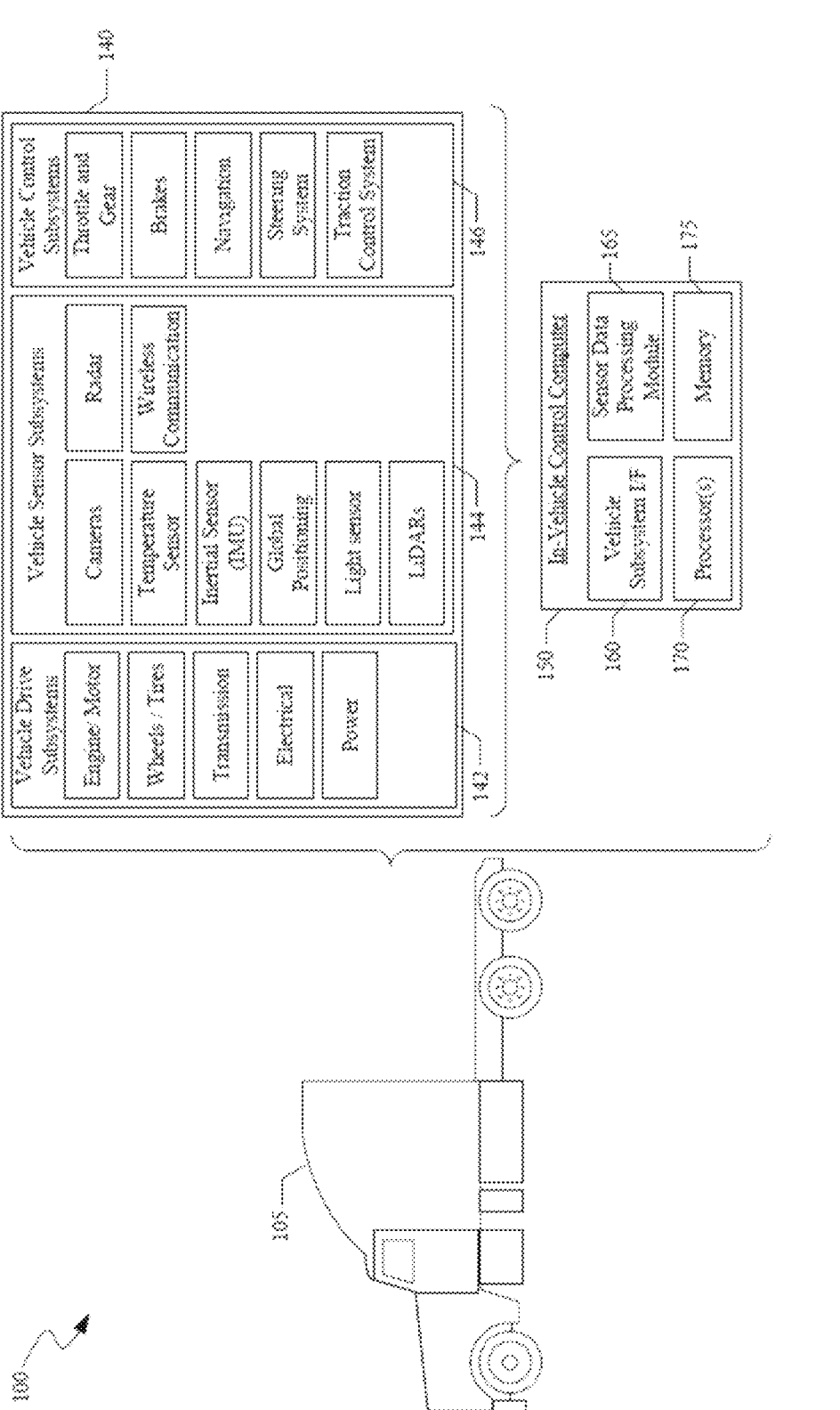
FIG. 10 shows an example of a schematic diagram that illustrates a vehicle based on some implementations of the disclosed technology.

FIG. 10 shows a system 100 that is included by an autonomous or semi-autonomous vehicle 105. The vehicle 105 includes a plurality of vehicle subsystems 140 and an in-vehicle control computer 150. The plurality of vehicle subsystems 140 includes vehicle drive subsystems 142, vehicle sensor subsystems 144, and vehicle control subsystems. An engine or motor, wheels and tires, a transmission, an electrical subsystem, and a power subsystem may be included in the vehicle drive subsystems. The engine of the vehicle 105 may be an internal combustion engine, a fuel-cell powered electric engine, a battery powered electrical engine, a hybrid engine, or any other type of engine capable of moving the wheels on which the vehicle 105 moves. The vehicle 105 has multiple motors or actuators to drive the wheels of the vehicle, such that the vehicle drive subsystems 142 include two or more electrically driven motors. The transmission may include a continuous variable transmission or a set number of gears that translate the power created by the engine into a force that drives the wheels of the vehicle. The vehicle drive subsystems may include an electrical system that monitors and controls the distribution of electrical current to components within the system, including pumps, fans, and actuators. The power subsystem of the vehicle drive subsystem may include components that regulate the power source of the vehicle.

Vehicle sensor subsystems 144 can include sensors for general operation of the vehicle 105, including those which would indicate a malfunction in the AV or another cause for an AV to perform a limited or minimal risk condition (MRC) maneuver. The sensors for general operation of the vehicle may include cameras, a temperature sensor, an inertial sensor (IMU), a global positioning system, a light sensor, a LIDAR system, a radar system, and wireless communications supporting network available in the vehicle 105.

The in-vehicle control computer 150 can be configured to receive or transmit data from/to a wide-area network and network resources connected thereto. A web-enabled device interface (not shown) can be included in the vehicle 105 and used by the in-vehicle control computer 150 to facilitate data communication between the in-vehicle control computer 150 and the network via one or more web-enabled devices. Similarly, a user mobile device interface can be included in the vehicle 105 and used by the in-vehicle control system to facilitate data communication between the in-vehicle control computer 150 and the network via one or more user mobile devices. The in-vehicle control computer 150 can obtain real-time access to network resources via network. The network resources can be used to obtain processing modules for execution by processor 170, data content to train internal neural networks, system parameters, or other data. In some implementations, the in-vehicle control computer 150 can include a vehicle subsystem interface (not shown) that supports communications from other components of the vehicle 105, such as the vehicle drive subsystems 142, the vehicle sensor subsystems 144, and the vehicle control subsystems 146.

The vehicle control subsystem 146 may be configured to control operation of the vehicle, or truck, 105 and its components. Accordingly, the vehicle control subsystem 146 may include various elements such as an engine power output subsystem, a brake unit, a navigation unit, a steering system, and an autonomous control unit. The engine power output may control the operation of the engine, including the torque produced or horsepower provided, as well as provide control of the gear selection of the transmission. The brake unit can include any combination of mechanisms configured to decelerate the vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the GPS device and one or more predetermined maps so as to determine the driving path for the vehicle 105. The steering system may represent any combination of mechanisms that may be operable to adjust the heading of vehicle 105 in an autonomous mode or in a driver-controlled mode.

The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the GPS device, the RADAR, the LiDAR (also referred to as LIDAR), the cameras, and/or other vehicle subsystems to determine the driving path or trajectory for the vehicle 105. The autonomous control unit may activate systems to allow the vehicle to communicate with surrounding drivers or signal surrounding vehicles or drivers for safe operation of the vehicle.

An in-vehicle control computer 150, which may be referred to as a VCU (vehicle control unit), includes a vehicle subsystem interface 160, a driving operation module 168, one or more processors 170, a compliance module 166, a memory 175, and a network communications subsystem (not shown). This in-vehicle control computer 150 controls many, if not all, of the operations of the vehicle 105 in response to information from the various vehicle subsystems 140. The one or more processors 170 execute the operations that allow the system to determine the health of the AV, such as whether the AV has a malfunction or has encountered a situation requiring service or a deviation from normal operation and giving instructions. Data from the vehicle sensor subsystems 144 is provided to in-vehicle control computer 150 so that the determination of the status of the AV can be made. The compliance module 166 determines what action needs to be taken by the vehicle 105 to operate according to the applicable (i.e., local) regulations. Data from other vehicle sensor subsystems 144 may be provided to the compliance module 166 so that the best course of action in light of the AV's status may be appropriately determined and performed. Alternatively, or additionally, the compliance module 166 may determine the course of action in conjunction with another operational or control module, such as the driving operation module 168.

The memory 175 may contain additional instructions as well, including instructions to transmit data to, receive data from, interact with, or control one or more of the vehicle drive subsystem 142, the vehicle sensor subsystem 144, and the vehicle control subsystem 146 including the autonomous Control system. The in-vehicle control computer 150 may control the function of the vehicle 105 based on inputs received from various vehicle subsystems (e.g., the vehicle drive subsystem 142, the vehicle sensor subsystem 144, and the vehicle control subsystem 146). Additionally, the in-vehicle control computer 150 may send information to the vehicle control subsystems 146 to direct the trajectory, velocity, signaling behaviors, and the like, of the vehicle 105. The autonomous control vehicle control subsystem may receive a course of action to be taken from the compliance module 166 of the in-vehicle control computer 150 and consequently relay instructions to other subsystems to execute the course of action.

The various methods described in the present document may be implemented on the vehicle 100 described with reference to FIG. 10. For example, one or more processors 170 may be configured to implement the object detection techniques described herein.

5. Example Embodiments

Having discussed some basic concepts of PV based and BEV based segmentation and detection techniques, we now describe some functional building blocks that may be adopted by embodiments that implement the proposed DuoSpaceNet technique.

6. Duo Space Features

Figure 11:
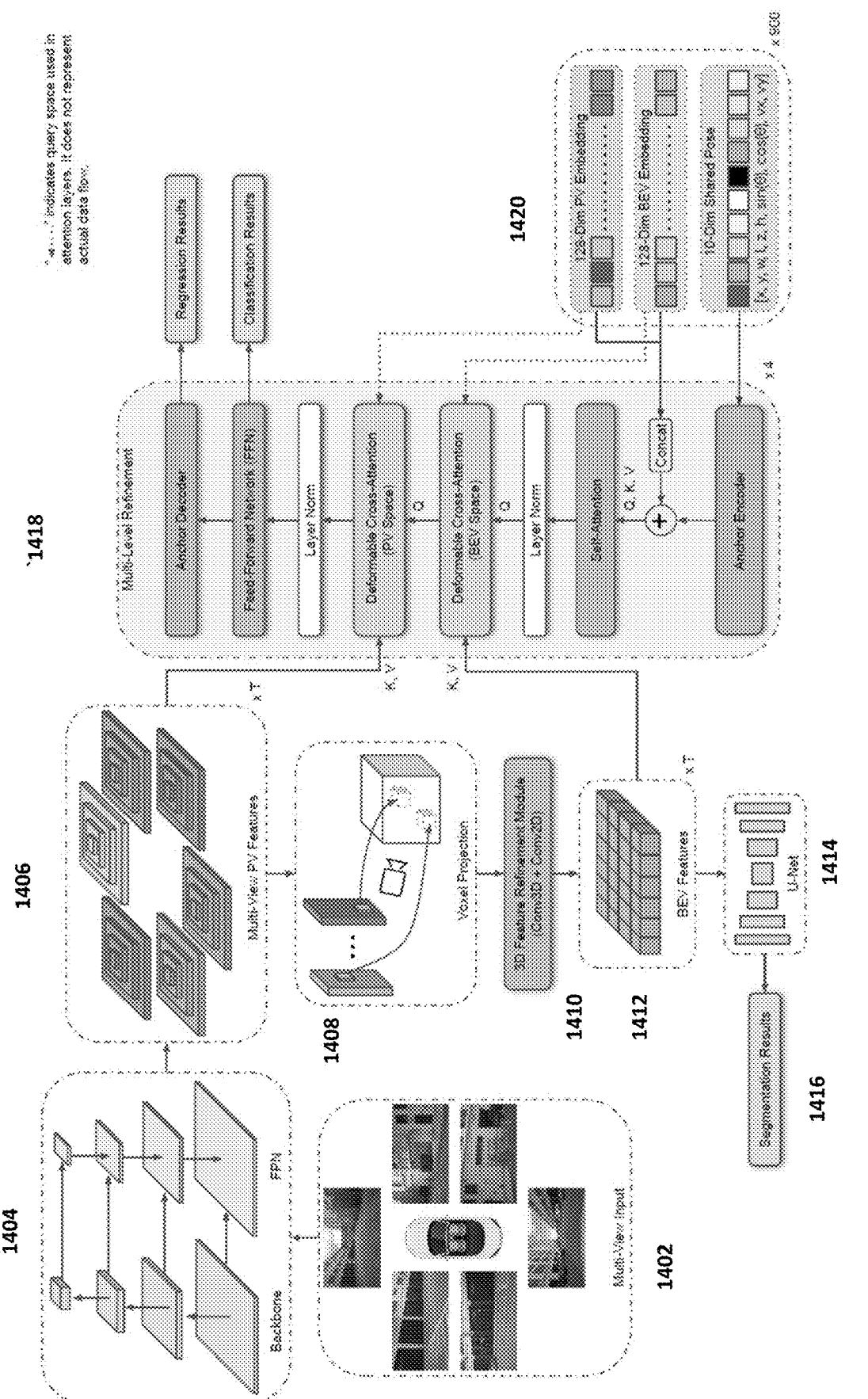
FIG. 11 depicts another workflow according to some disclosed embodiments.

Feature extraction. As shown in FIG. 11, multi-view images $$\{I_i\}_{i=1}^N \subset \square^{H \times W \times 3} \tag{1402}$$

are first processed by an image encoder, which includes a backbone network (e.g., ResNet) and a neck (e.g., feature pyramid network FPN), to generate multi-scale PV features 1406

$$\{F_{PV}^j \in \square^{N \times C_j \times H_j \times W_j}, j = 1, 2, \dots M\},$$

where N,M are the number of cameras and different scales, $H_j, W_j, C_j$ denote the feature map height, width and channel number of the j-th scale. A transformation stage 1408 such as a voxel projection algorithm may be used for this processing. Multi-view multi-scale PV features are lifted from 2D to 3D via a simple parameter-free back-projection module. A 3D volume of coordinates with size X×Y×Z is generated and projected onto multiple images, where X,Y,Z denotes the size of the voxel space. The 3D features may be refined using a refinement algorithm (stage 1410), which may be applied iteratively. Examples of such algorithms include Conv3D and Conv2D. BEV features 1412 for the input images may be generated as a result of the stage 1410. These features may be processed through a stage 1414 that provides segmentation results 1416. The stage 1414 may use, for example, u-net image segmentation technique. PV features sampled around the projected positions are then aggregated by bilinear interpolation, resulting in a voxel feature map $F_{voxel} \in \square^{C \times X \times Y \times Z}$, where C represent the channels of the voxel feature. Eventually, the Z dimension is reduced to yield a BEV feature map $F_{BEV} \in \square^{C \times X \times Y}$, during which a feature divergence enhancement process (described below) takes place to optimize and finetune $F_{voxel}$ as well as the generated $F_{BEV}$. In multi-frame settings, historical images are processed by the same procedure sequentially, generating PV and BEV feature maps for different frames. Both feature maps within a fixed temporal length are stored for future use.

Feature divergence enhancement. Our model benefits from the contrastiveness between the two feature representations. Since our lifting method is parameter-free, its functionality can be viewed as rearranging PV features given priors (e.g., camera poses) on the 3D geometry of a scene. Therefore, it has minimal effects on diverging the feature contents. To increase the heterogeneity of BEV features w.r.t. PV features, we propose a simple yet effective divergence enhancement stage acting on both $F_{voxel}$ and $F_{BEV}$. It consists of three 3D convolution layers (Conv3Ds) and 2D convolution layers (Conv2Ds). First, we apply Conv3Ds on $F_{voxel}$ to improve 3D geometry awareness in a learning-based fashion. After $F_{voxel}$ is flattened along its Z dimension, Conv2Ds are applied for further BEV-level refinement, yielding the final $F_{BEV}$.

The BEV features 1412 and the PV features 1406 may be input to a multi-level refinement stage 1418. The inputs to the stage 1418 include PV features/BEV features along with hybrid proposals/queries 1420. The multi-level refinement stage may use a cascade of an anchor encoder, a concatenation of the hybrid queries, a self-attention stage, a layer normalization stage, a deformable cross-attention in the BEV space, a deformable cross-attention in the PV space, a layer normalization, a feed-forward network and an anchor decoder. The stage 1418 may output regression results and object classification results.

7. Duo Space Decoder

The stage 1418 may perform due-space decoder function and comprise an ordered set of image processing steps. For example, in some embodiments, the shared pose object proposals may be received by an anchor encoder. The output of the anchor encoder may be combined with BEV proposals, e.g., by using a process of concatenation in which concatenation of proposals is performed. This may be followed by a self-attention process in which image data is processed. The self-attention may use either a pairwise self-attention or a patchwise self-attention to improve conditioning of data for detection. This may be followed by a layer normalization stage. The output of layer normalization may be processed through a deformable cross-attention in BEV space and PV space. After the processing, another stage of layer optimization may be used. The output of this layer normalization may be processed through a feed-forward network to generate classification results and then to an anchor decoder to generate regression results.

Duo space queries. Suppose we have k object queries, $$\{Q^i\}_{i=1}^k.$$

Each consists of a pose embedding.

$$Q_{Pose}^i,$$

and duo space content embedding for both BEV and PV space, $$Q_{BEV}^i \text{ and } Q_{PV}^i,$$

respectively. Each $$Q_{Pose}^i$$

11                                                                    12 is encoded from a 3D pose vector $P_i$, which contains attributes with physical meanings, including x,y,z in the vehicle coordinate system, the width, length, height, orientation and the velocity of the object the query is associated with. While $$Q_{BEV}^i \text{ and } Q_{PV}^i$$

contain high-level content features in BEV space and PV space respectively. In each layer of the duo space decoder, first, a pose encoder consisting of several FC layers is used to encode $$\{P_i\}_{i=1}^k$$

into a high dimensional latent representation, dubbed Enc $(P_i)$, i∈{1, 2, . . . , k}, which will serve as learnable positional encodings in the subsequent attention layers. To unify the 3D pose of each object query across BEV and PV space, we generate a shared pose embedding, $$Q_{Pose}^i = \xi(Enc(P_i)), i \in \{1, 2, \ldots, k\}, \tag{1}$$

where $\xi(\cdot)$ denotes a linear transformation to make the dimension of Enc($P_i$) the same as $$Q_{BEV}^i \text{ and } Q_{PV}^i.$$

The final duo space queries in BEV space and PV space can be derived by simply adding the corresponding content embedding with the shared pose embedding together by $$z_{BEV} = \{Q_{BEV}^i + Q_{Pose}^i\}_{i=1}^k, \tag{2}$$

$$z_{PV} = \{Q_{PV}^i + Q_{Pose}^i\}_{i=1}^k. \tag{3}$$

The self-attention layer thus can be represented as $$Q = K = V = z_{BEV} \oplus z_{PV}, \tag{4}$$

$$MHSA(Q, K, V) = Softmax\left(\frac{QK^T}{\sqrt{dim(K)}}\right)V, \tag{5}$$

where $\oplus$ denotes a concatenation operator along the channel dimension and MHSA( . . . ) stands for multi-head self-attention.

Partial cross-attention. For multi-head partial cross-attention layers MHPCA$_{BEV}$( . . . ) and MHPCA$_{PV}$( . . . ), each of them will only act on their corresponding feature space using corresponding inputs. Hence, the partial cross-attention on the BEV space can be represented as $$\hat{p}_{BEV} = \{P_i \mid_{x,y}\}_{i=1}^k, \tag{6}$$

$$MHPCA_{BEV}( \ldots ) = MSDA(z_{BEV}, \hat{p}_{BEV}, F_{BEV}), \tag{7}$$

where $\hat{p}_{BEV}$ denotes the normalized coordinates of 3D reference points (only using their X and Y components here). MSDA( . . . ) is the Multi-Scale Deformable Attention Module (MSDeformAttn). Similarly, we have cross-attention on the PV space as $$\hat{p}_{PV} = \{Proj(P_i \mid_{x,y,z}, \{K_n, T_n\}_{n=1}^N)\}_{i=1}^k, \tag{8}$$

$$MHPCA_{PV}( \ldots ) = MSDA\left(z_{PV}, \hat{p}_{PV}, \{F_{PV}^j\}_{j=1}^M\right), \tag{9}$$

where Proj( . . . ) refers to the projection of 3D LiDAR coordinates into 2D image frames using camera matrices $$\{K_n\}_{n=1}^N \subset \square^{33} \text{ and } \{T_n\}_{n=1}^N \subset \square^{4 \times 4}.$$

Since this attention happens in PV space, multi-scale PV features $$\{F_{PV}^j\}_{j=1}^M$$

are used. Following feature extraction and refinement through multi-head partial cross-attention layers, the outputs of MHPCA$_{BEV}$ and MHPCA$_{PV}$ are concatenated as refined object queries, which are then fed into a 2-layer feed forward network (FFN). Finally, the FFN outputs are used for object category prediction and are also decoded into 10-dim 3D poses as our detection regression results. The refined poses then serve as inputs for subsequent decoder layers.

8. Duo Space Temporal Modeling

BEV-based 3D detection methods typically utilize temporal inputs by stacking temporal BEV feature maps. Offsets are determined either with motion compensation or in a learnable manner (e.g., deformable attention) or both combined. Meanwhile, PV-based methods generally infuse temporal information into object queries. Therefore, the difference between BEV-based and PV-based temporal methods brings challenges to temporal design in our duo space paradigm. In this section, we present a unified temporal solution for both spaces via temporal duo space queries, illustrated in FIG. 12.

Figure 12:
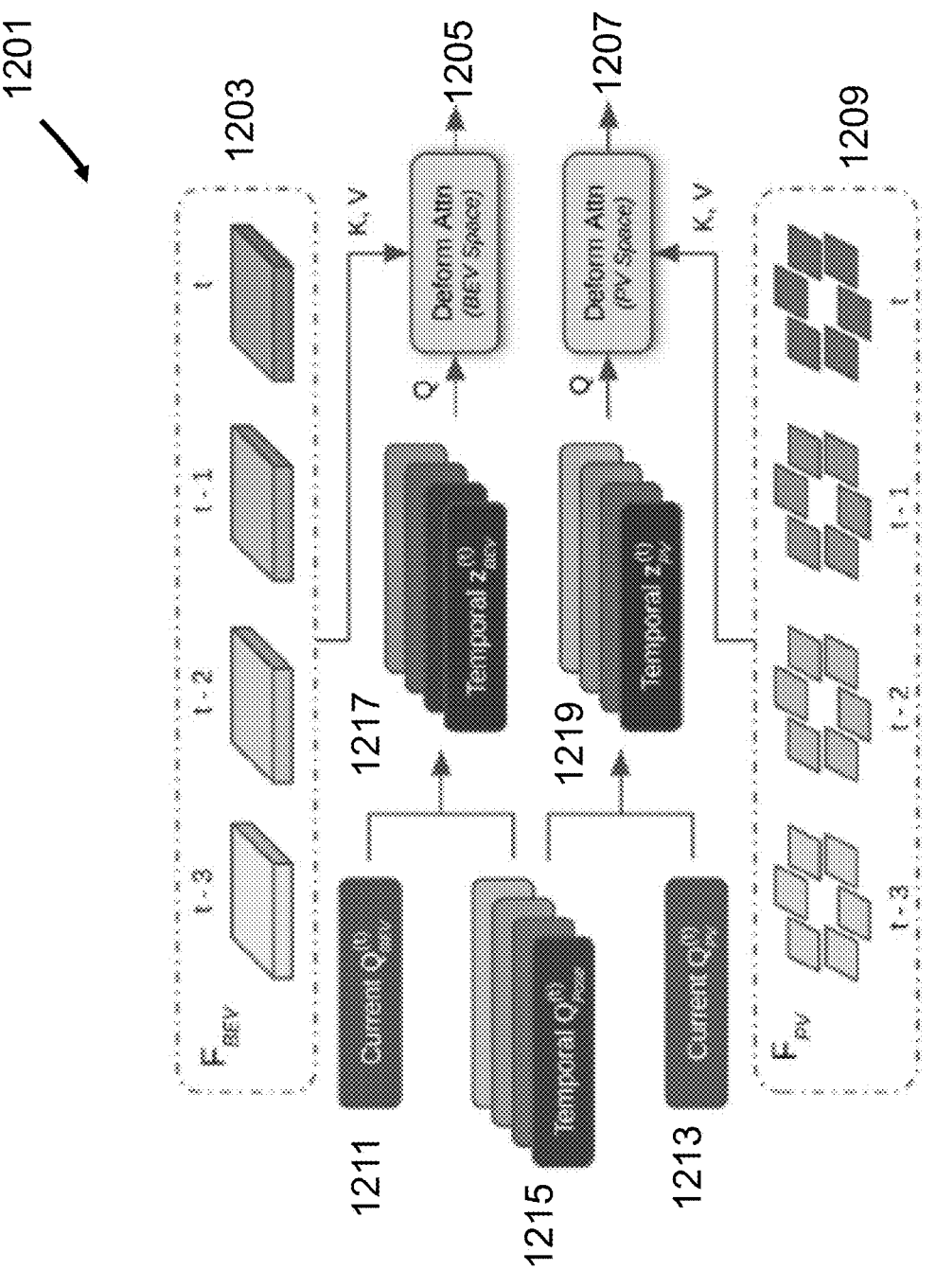
FIG. 12 is an example of a proposed duo space temporal modeling with four frames.

FIG. 12 shows an example of a duo-space temporal modeling 1201 with 4 frames (in general, a different number of frames may be used). The BEV features for the four frames are shown as 1203 (t represents time). The PV features for the four frames are shown as 1209. Temporal pose embeddings $$Q_{Pose}^{(t)}$$

are generated by warping pose vectors at current timestamp with motion compensation. Subsequently, temporal duo-space queries $$z_{BEV}^{(t)} \text{ and } z_{PV}^{(t)}$$

are assembled by broadcasting current content embeddings into the temporal pose embeddings. A partial deformable cross-attention may be conducted using the recent BEV and PV feature maps (1205 and 1207 respectively), both of which are maintained with their respective memory queue. Temporal queries at each timestamp (1211 for BEV features and 1213 for PV features) may only interact with feature maps at corresponding time stamps. The resulting queries are aggregated via an MLP in a recurrent fashion (MLP is not explicitly shown in the figure). Specifically, each object is represented by a series of temporal duo space queries (1217 and 1219), comprising temporal poses of the underlying object and its current content embedding. Temporal poses are deduced by applying both ego-and object-motion compensation on the object's current pose vector. Hence, for a fixed temporal length, denoted as l, the number of temporal duo space queries generated for each object is l. The queries are fed into the partial cross-attention layer corresponding to their space. Each query only attends to features at a specific timestamp indicated by its pose. Subsequently, results produced by I temporal queries are recurrently aggregated via multi-layer perceptron (MLP) into a single refined prediction per object. Simulations have shown that the solution works the same way across BEV and PV space.

9. Multi-Task Learning

Similar to BEV-based methods, our model is capable of joint optimization of detection and segmentation. To perform dense segmentation, we simply add a segmentation branch consisting of a U-Net like structure for feature enhancement and two parallel convolution-based segmentation heads for final predictions. It takes the BEV feature map $F_{BEV}$ as input, and outputs two segmentation masks of the same resolution. To supervise the map segmentation branch, a weighted sum of focal loss and dice loss is used during training.

10. Workflow Examples

Figure 13:
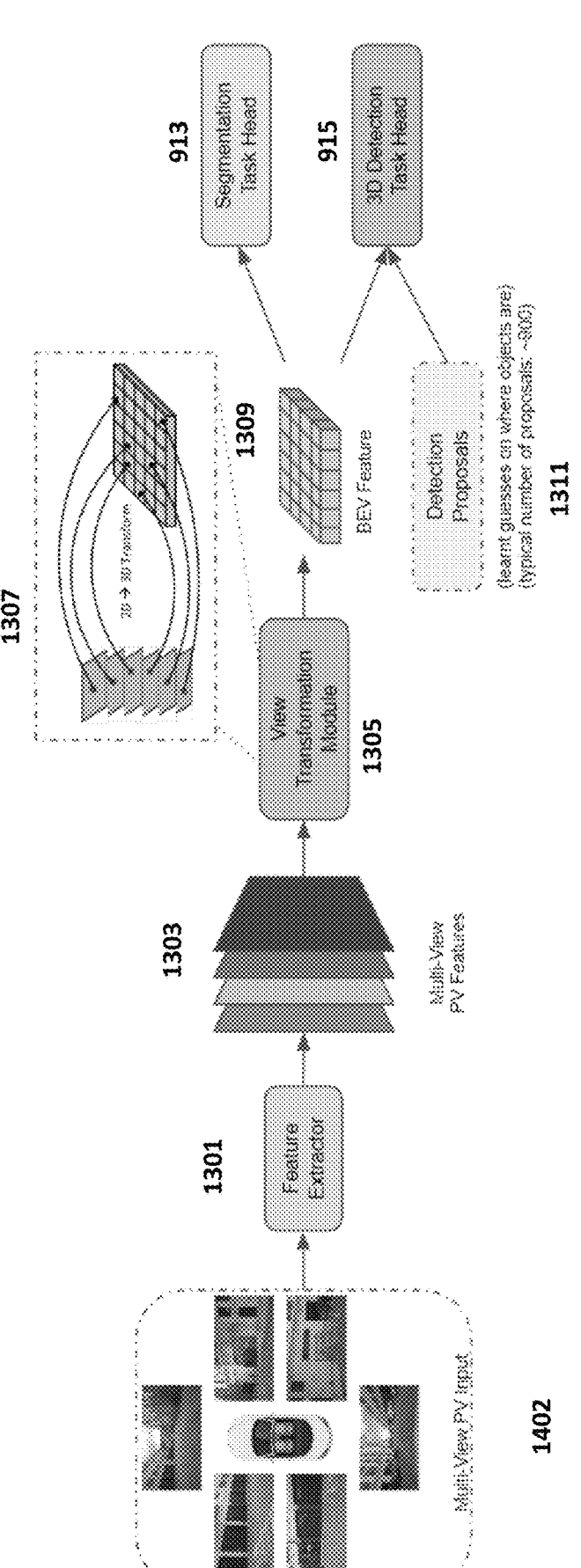
FIG. 13 is a block diagram of an example workflow for generating a BEV feature map.

FIG. 13 is a block diagram of an example workflow for generating a BEV feature map. In this example, from left to right, multi-view PV input is provided to an image processing algorithm that processes the images (1402) through a feature extractor 1301. The feature extractor operation results in multi-view PV features 1303 (may be similar to 907). The multi-view PV features are then processed by a view transformation module 1305 (typically software-implemented) in which a 2D to 3D transform (1307) may be applied to generate BEV features (1309). The BEV features are then input to a segmentation task and a 3D detection task. The 3D detection task may also be provided with detection proposals 1311 that are learnt guesses about where the objects are. As an example, in a "dense" implementation, with input size having 6 images with [Height, Width])= [1024, 576], PV features sizes may be 6×[256, 144], while BEV feature size may be 1×[640, 320], and around 900 proposals may be used.

FIG. 14 depicts various algorithms for view transformation. In the table, the second column lists various lifting methods that may be used and their directionalities, including (1) homography based (unprojection), (2) depth based (unprojection), (3) parameter free (unprojection), (4) MLP (multi-layer perceptron) based (projection), (5) transformer based (projection) and (6) parameter free (projection) methods. Here, projection refers to converting 3D coordinates to 2D coordinates, while unprojection refers to otherwise.

General flow of these methods may include, for example, inputting RGB ResNet images, processing them to pull from the 2D images 3D features and generating a volume of 3D features. For each 3D coordinate, subpixel positions may be determined using a scheme such as a bilinear scheme. The 3D feature volume may be reduced in vertical dimension to a set of BEV features that may be then input to a BEV ResNet.

Figure 15:
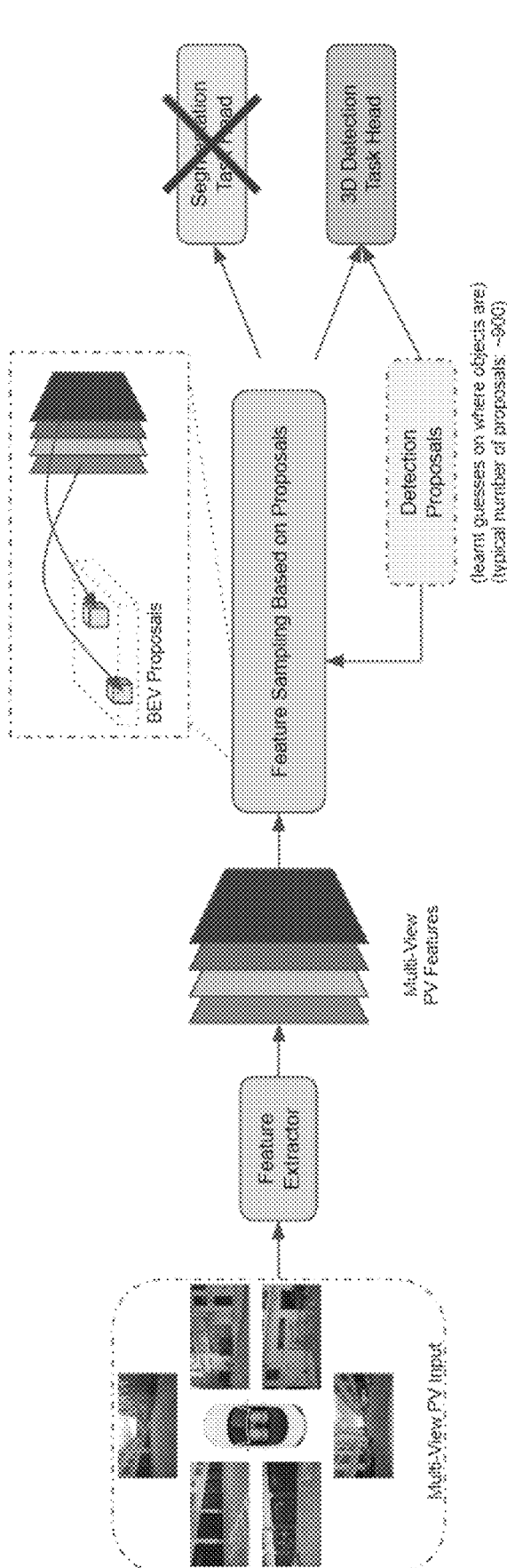
FIG. 15 is a block diagram of another workflow for generating a BEV feature map.
Figure 16:
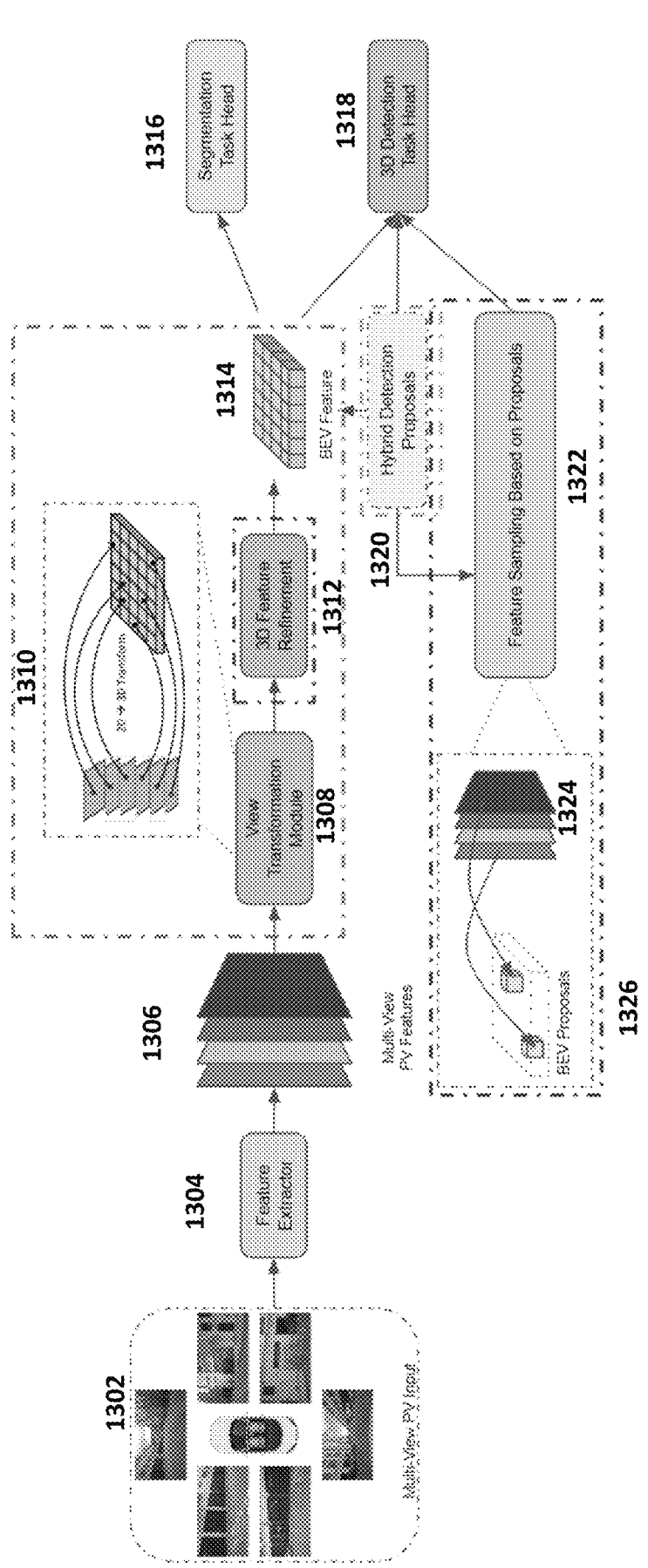
FIG. 16 depicts a workflow according to some disclosed embodiments.

FIG. 15 is a block diagram of another workflow for generating a BEV feature map. This workflow is similar to workflow 903. Here, a "sparse" model may be used in which a dense BEV feature map may not be generated. In this workflow, multi-view PV input may be processed by the feature extractor, followed by generation of multi-view features that are samples based on detection proposals. BEV proposals may be generated from the multi-view PV features. The resulting features are input to the 3D detection task, along with the proposals, while no segmentation task may be performed.

Speaking generally, sparse methods may be more efficient and may tend to be more accurate. Sparse methods do not perform explicit view transformation and therefore do not lose any information. Sparse methods can be optimized to detect objects up to 300 meters range. It is noted that view transformations tend to degrade image quality as the object distance increases.

However, sparse methods typically cannot perform effective BEV segmentation. Sparse methods also do not work well with multi-modality of sensors (e.g., radar and lidar sensors). Furthermore, sparse methods are also sensitive to object heights and cannot distinguish overlapping objects well.

11. 2D-3D Fusion Examples

Figure 17:
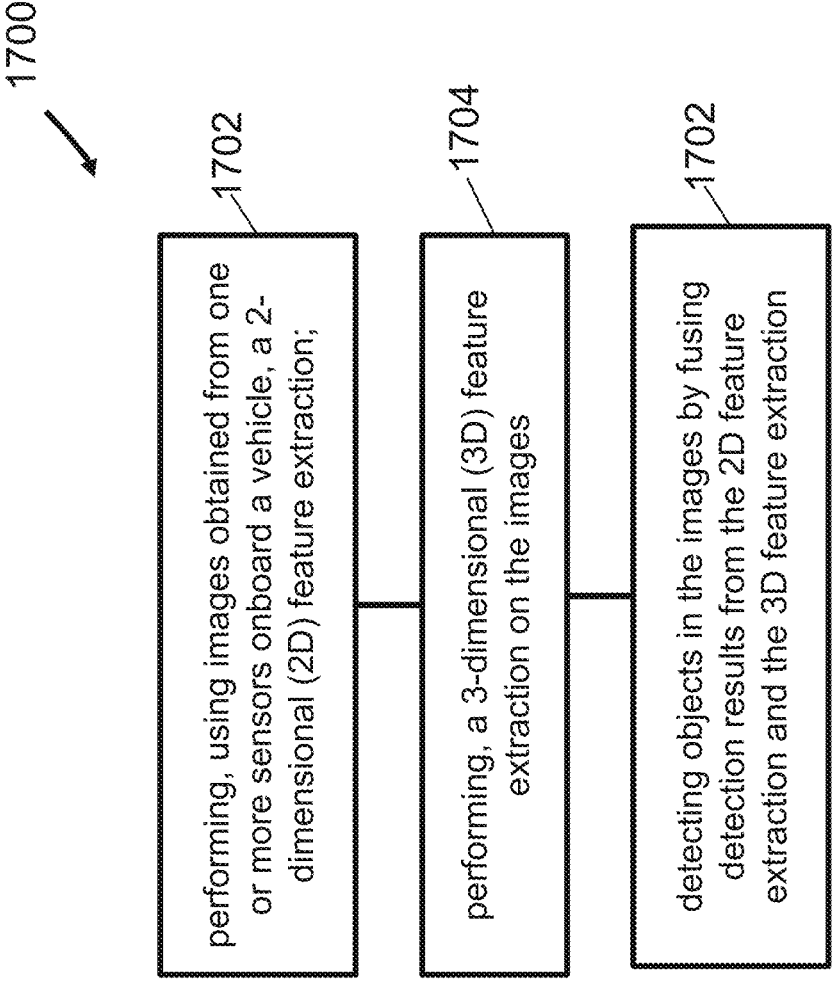

FIG. 17 depicts a workflow according to some disclosed embodiments. The processing flow generally proceeds from left to right of the drawing. At 1302, multi-view PV input images are received, e.g., from sensors of a self-driving vehicle. At 1304, the feature extractor extracts multi-view PV features (1306). The multi-view PV features 1306 are processed through a view transformation stage 1308. A 3D refinement is performed on the output of the view transformation module in the 3D refinement stage 1312. The view transformation stage 1308 may use a 2D to 3D transform (e.g., as depicted in block 1310).

After the 3D refinement stage 1312, the resulting BEV features 1314 may be input to a segmentation task head 1316 to perform further segmentation tasks. The BEV features 1314 may also be input to a 3D detection task head 1318 that performs the 3D detection using hybrid detection proposals 1320. The hybrid detection proposals may also be used by stage 1322 that performs feature sampling based on the proposals and provide the resulting information to the 3D detection task head 1318. As further depicted in FIG. 17, the feature sampling 1322 may correlate the multiview PV features 1324 (which may be substantially similar to 1306) with corresponding BEV proposals 1326.

12. Example Technical Solutions

Some preferred embodiments may adopt the following technical solutions.

1. An image processing method (e.g., method 1700 depicted in FIG. 17), comprising: performing (1702), using images obtained from one or more sensors onboard a vehicle, a 2-dimensional (2D) feature extraction; performing (1704), a 3-dimensional (3D) feature extraction on the images; detecting (1706) objects in the images by fusing detection results from the 2D feature extraction and the 3D feature extraction.

2. The method of solution 1, wherein the 2D feature extraction comprises a perspective view (PV) analysis of the images.

3. The method of any of clams 1-2, wherein the 3D feature extraction comprises a bird's eye view (BEV) analysis of the images.

4. The method of any of solutions 1-3, wherein the 3D feature extraction is performed by: generating 3D features from the 2D feature resulting from the 2D feature extraction; and the method further includes refining 3D feature estimates using dual-space object queries that include joint proposals formed based on 2D features resulting from the 2D feature extraction and 3D features resulting from the 3D feature extraction. For example, the duo-space framework disclosed in the present document may be used.

5. The method of solution 4, wherein the generating the 3D features from the 2D features comprises applying a back-projection model to the 2D features.

6. The method of any of solutions 4-5, wherein the refining is performed using a Conv3D or a Conv2D algorithm. A Conv3D algorithm may include, for example, a spatial convolution over volumes by creating a convolution kernel that is convolved with input to the layer to generate a tensor. In the Conv3D algorithm, the kernel may slide in 3 dimensions. Here, "slide" refers to the element-wise multiplication performed in convolution over sliding positions. Different from Conv3D, in Conv2D, the kernel may slide over a 2D input data (e.g., by performing elementwise multiplication, that is then summed up to generate a single output value.

7. The method of any of solutions 4-6, wherein the refining comprises performing a multi-level refinement wherein, at each layer of the multi-level refinement, a self-attention layer that acts on both the 2D features and the 3D features a first cross-attention layer that acts only on the 2D features and a second cross-attention layer that acts only on the 3D features are used.

8. The method of any of solutions 4-7, wherein a shared pose is further used during the refining.

9. The method of any of solutions 1-8, wherein the 2D feature extraction method comprises a 3D objection method.

10. The method of any of solutions 1-9, wherein the 3D feature extraction method comprises a dense segmentation and/or a detection method.

Further embodiments and details are described with reference to FIGS. 5 to 14.

11. An image processing method (e.g., method 1800 depicted in FIG. 18), comprising: determining (1802) a two-dimensional (2D) feature map of one or more images using an image feature extraction algorithm; performing (1804) a transformation of the sparse feature map to a three-dimensional (3D) space; generating (1806) a dense feature map in the 3D space by iteratively applying one or more refinement modules to a result of the transformation; and detecting (1808) objects in the one or more images by fusing the sparse feature map and the dense feature map.

12. The method of solution 11, wherein the one or more refinement modules comprise a local convolutional module or a global convolutional module.

13. The method of any of solutions 11-12, wherein the 2D feature map is determined using a perspective view (PV) analysis of the one or more images.

14. The method of any of solutions 11-13, wherein the dense feature map in the 3D space comprises a bird's eye view (BEV) feature map.

15. The method of any of solutions 11-14, wherein the fusing the sparse feature map and the dense feature map comprises performing a multi-level refinement.

16. The method of solution 15, wherein the multi-level refinement uses object proposals that are based on both the BEV feature map and the PV feature map.

Further embodiments and details are described with reference to FIGS. 8-15.

17. An image processing method (e.g., method 1900 depicted in FIG. 19), comprising: determining (1902) a two-dimensional (2D) feature map of one or more images based on a feature extraction algorithm; determining (1904) a three-dimensional (3D) feature map of the one or more images based on a feature extraction algorithm; detecting (1906) objects in the one or more images by performing a multi-level refinement on the 2D feature map and the 3D feature map such that, at each level, one or more object proposals are used for object detection, wherein each object proposal comprises a first part corresponding to an anchor point that is shared between the 2D feature map and the 3D feature map, a part that is specific to the 2D feature map and a third part that is specific to the 3D feature map; and performing (1908) a bird's eye view (BEV) segmentation using the 3D feature map.

18. The method of solution 1, wherein the 3D feature map is obtained by processing the 2D feature map through one or more refinement modules.

19. The method of any of solutions 17-18, wherein the 2D feature map comprises a perspective view (PV) feature map.

20. The method of any of solutions 17-19, wherein the 3D feature map comprises a bird's eye view (BEV) feature map.

21. The method of any of solutions 17-20, further including generating regression results from the multi-level refinement.

22. The method of any of solutions 17-21, wherein the one or more images are captured using one or more sensors mounted on one or more vehicles.

23. The method of any of solutions 17-22, wherein the one or more images comprise an red green blue (RGB) format, an RGB-D format, point cloud images, or radar images.

24. The method of any of solutions 17-23, wherein the 2D feature extraction or the 3D feature extraction perform semantic segmentation, instance segmentation, panoptic segmentation, or occupancy prediction.

25. The method of any of solutions 17-24, wherein the 3D features are generated from the 2D features using a camera back-projection method, a lidar point cloud sensoring method or a camera homography method.

Further embodiments and details are described with reference to FIGS. 8-15.

26. An image processing apparatus comprising one or more processors configured to implement a method recited in any of solutions 1-25.

27. A computer-storage medium having process-executable code for implementing an above-recited method stored thereon.

In some embodiments, system for deployment on an autonomous vehicle, comprising: one or more sensors configured to generate sensor data of an environment of the autonomous vehicle; and at least one processor configured to detect objects in the sensor data performing method 1700. In some embodiments, hybrid detection proposals that combine or fuse together features from the PV and BV detection are used for object detection and/or segmentation.

13. Experiment Results

Dataset. We benchmark our method on nuScenes dataset, one of the most widely-used public datasets in autonomous driving. The nuScenes dataset consists of 1,000 driving video clips. Each clip is 20-second long at the sampling frequency of 2 Hz. Across the dataset, image data come from the same 6-camera setup, facing at 6 directions, providing a full 360° panoramic view. For 3D object detection task, the dataset contains 10 commonly-seen classes (e.g., car, pedestrian), in total ~1.4M bounding boxes. We evaluate our 3D detection results using official nuScenes metrics, including mean average precision (mAP), nuScenes detection score (NDS), mean average error of translation (mATE), scale (mASE), orientation (mAOE), velocity (mAVE) and attriheads in both self-attention and cross attention layers. For deformable cross attention layers, we compute 16 offsets per query. For multi-frame experiments, we use 4 adjacent frames (including the current frame) as temporal input. For all ablation studies, we use ResNet-50, 100×100 BEV feature map (if applicable), 800×320 input images and a 2-layer decoder, trained for 12 epochs. For map segmentation, we follow the work in PETRv2 to transform map layers from the nuScenes dataset into the ego frame, and generate two 200×200 ground truth segmentation masks for drivable area and lane boundary respectively.

13.1. 3D Object Detection Results

Our 3D detection results on nuScenes val set are shown in Table 1. Compared with other state-of-the-art single-/multi-frame methods, our method consistently outperforms others on mAP. Specifically, we achieve 1.7% mAP gain over the state-of-the-art PV-based method Sparse4D and 2.4% mAP gain over the state-of-the-art BEV-based method BEV-Former-S, using the single-frame setup. The same is true for multi-frame results. Among all methods, DuoSpaceNet achieves the lowest mATE by a large margin, suggesting that our duo space design helps the model understand 3D scenes better. When it comes to other metrics, although our method does not achieve 1st place for some entries, we argue that on average our model surpasses others based on the NDS measurement. We also report our results on nuScenes test set in Table 4. Compared with PolarFormer-T, DuoSpaceNet achieves a considerable 1.2% mAP gain and 2.6% NDS gain. Note that different methods use different training strategy on the test set (e.g., longer training schedules, more temporal frames, etc.). Nonetheless, our model is capable of achieving competitive results against other state-of-the-art models.

TABLE 1

Comparison on the nuScenes val set. All experiments use ResNet-101-DCN and benefit from perspective view pre-training. Test time augmentation is not used for all experiments.

| Method | Epochs | Image Size | Frames | mAP↑ | NDS↑ | mATE↓ | mASE↓ | mAOE↓ | mAVE↓ | mAAE↓ |
|---|---|---|---|---|---|---|---|---|---|---|
| DETR3D | 24 | 1600 × 900 | 1 | 0.349 | 0.434 | 0.716 | 0.268 | 0.379 | 0.842 | 0.200 |
| PETR | 24 | 1600 × 900 | 1 | 0.370 | 0.442 | 0.711 | 0.267 | 0.383 | 0.865 | 0.201 |
| BEVFormer-S | 24 | 1600 × 900 | 1 | 0.375 | 0.448 | 0.725 | 0.272 | 0.391 | 0.802 | 0.200 |
| Sparse4D | 24 | 1600 × 640 | 1 | 0.382 | 0.451 | 0.710 | 0.279 | 0.411 | 0.806 | 0.196 |
| SimMOD | 24 | 1600 × 900 | 1 | 0.366 | 0.455 | 0.698 | 0.264 | 0.340 | 0.784 | 0.197 |
| *DuoSpaceNet (Ours)* | *24* | *1600 × 640* | *1* | *0.399* | *0.462* | *0.683* | *0.279* | *0.376* | *0.829* | *0.205* |
| BEVFormer | 24 | 1600 × 900 | 4 | 0.416 | 0.517 | 0.673 | 0.274 | 0.372 | 0.394 | 0.198 |
| PolarDETR | 24 | 1600 × 900 | 2 | 0.383 | 0.488 | 0.707 | 0.269 | 0.344 | 0.518 | 0.196 |
| UVTR | 24 | 1600 × 900 | 6 | 0.379 | 0.483 | 0.731 | 0.267 | 0.350 | 0.510 | 0.200 |
| PETRv2 | 24 | 1600 × 640 | 6 | 0.421 | 0.524 | 0.681 | 0.267 | 0.357 | 0.377 | 0.186 |
| Sparse4D | 24 | 1600 × 640 | 4 | 0.436 | 0.541 | 0.633 | 0.279 | 0.363 | 0.317 | 0.177 |
| *DuoSpaceNet (Ours)* | *24* | *1600 × 640* | *4* | *0.443* | *0.547* | *0.603* | *0.275* | *0.360* | *0.314* | *0.195* | bute (mAAE). For map segmentation, we follow previous works and evaluate our method with intersection of union (IoU) metric.

Implementation details. For both single-frame & multi-frame 3D detection experiments, if not specified otherwise, we followed a pre-determined hyperparameter settings, including the learning rate and its schedule, data augmentation, loss functions and anchor initialization. For full model experiments on nuScenes val and test set, the BEV feature map is sized 200×200 and the number of decoder layers is 4. All layers have identical settings with 8 attention We also compare our model complexity against other state-of-the-art BEV-only or PV-only methods. The input is 1600×640 for all models. For efficiency reason, we use a lite version of our model, with the size of BEV feature map reduced to 100×100 and without the feature divergence enhancement. For all three models, we test them on the same machine using DeepSpeed Flops Profiler. As shown in Table 2, under similar model sizes, DuoSpaceNet significantly outperforms BEVDet and BEVFormer-S. It is also slightly better than Sparse4D, yet still capable of handling dense segmentation tasks.

TABLE 2

Comparison on model complexity in terms of the number of parameters (params) and the number of floating-point operations (flops).

| Method | Space | Params | Flops | mAP↑ | NDS↑ |
|---|---|---|---|---|---|
| BEVDet | BEV | 69.5M | 1498.8G | — | — |
| BEVFormer-S | BEV | 66.6M | 1705.5G | 0.375 | 0.448 |
| Sparse4D$_{T-1}$ | PV | 58.3M | 1453.8G | 0.382 | 0.451 |
| *DuoSpaceNet* | *BEV + PV* | *64.8M* | *1771.7G* | *0.383* | *0.455* |

13.2. Map Segmentation Results

In Table 3, we benchmark the map segmentation performance on nuScenes val set. All methods use ResNet-101-DCN backbone except for M2BEV, who has a more advanced backbone. We only carry out single-frame segmentation experiments due to training time and GPU memory constraints.

TABLE 3

Map segmentation on the nuScenes val set.

| Method | Temporal | Joint Training | IoU-Drivable↑ | IoU-Lane↑ |
|---|---|---|---|---|
| LSS | X | X | 72.9 | 20.0 |
| M²BEV | X | √ | 75.9 | 38.0 |
|  | X | X | 77.2 | 40.5 |
| BEVFormer-S | X | √ | 77.6 | 19.8 |
|  | X | X | 80.7 | 21.3 |
| BEVFormer | √ | √ | 77.5 | 23.9 |
|  | √ | X | 80.1 | 25.7 |
| UniAD | √ | √ | 69.1 | 31.3 |
| PETRv2 | √ | X | 83.3 | 44.8 |
| *DuoSpaceNet* | *X* | *√* | *80.8* | *45.9* |
| *(Ours)* | *X* | *X* | *81.2* | *46.5* |

TABLE 4

Comparison on the nuScenes test set. All experiments are camera-only methods using V2-99 backbone with additional data. Test time augmentation is not used for all experiments.

| Method | Temporal | Image Size | mAP↑ | NDS↑ | mATE↓ | mASE↓ | mAOE↓ | mAVE↓ | mAAE↓ |
|---|---|---|---|---|---|---|---|---|---|
| DETR3D | X | 1600 × 900 | 0.412 | 0.479 | 0.641 | 0.255 | 0.394 | 0.845 | 0.133 |
| BEVDet | X | 1600 × 900 | 0.424 | 0.488 | 0.524 | 0.242 | 0.373 | 0.950 | 0.148 |
| BEVFormer-S | X | 1600 × 900 | 0.435 | 0.495 | 0.589 | 0.254 | 0.402 | 0.842 | 0.131 |
| PETR | X | 1408 × 512 | 0.441 | 0.504 | 0.593 | 0.249 | 0.383 | 0.808 | 0.132 |
| PolarFormer | X | 1600 × 900 | 0.455 | 0.503 | 0.592 | 0.258 | 0.389 | 0.870 | 0.132 |
| *DuoSpaceNet (Ours)* | *X* | *1600 × 640* | *0.460* | *0.519* | *0.559* | *0.259* | *0.399* | *0.765* | *0.134* |
| UVTR | √ | 1600 × 900 | 0.472 | 0.551 | 0.577 | 0.253 | 0.391 | 0.508 | 0.123 |
| BEVFormer | √ | 1600 × 900 | 0.481 | 0.569 | 0.582 | 0.256 | 0.375 | 0.378 | 0.126 |
| PETRv2 | √ | 1600 × 640 | 0.490 | 0.582 | 0.561 | 0.243 | 0.361 | 0.343 | 0.120 |
| PolarFormer-T | √ | 1600 × 900 | 0.493 | 0.572 | 0.556 | 0.256 | 0.364 | 0.439 | 0.127 |
| *DuoSpaceNet (Ours)* | *√* | *1600 × 640* | *0.505* | *0.598* | *0.512* | *0.255* | *0.356* | *0.308* | *0.121* |

Compared with previous single-frame methods, our model achieves the highest IoU for both drivable area and lane boundary, regardless of whether the segmentation branch is trained jointly with object detection or not. When it comes to the multi-frame setting, our single-frame model outperforms most state-of-the-art models such as BEV-Former and UniAD by a large margin. Compared with the current leading temporal method PETRv2, our single-frame model still excels in lane segmentation (46.5 IoU vs . . . 44.8) and achieves comparable performance in drivable area (81.2 IoU vs . . . 83.8 IoU).

13.3 Ablation Studies

Effectiveness of Duo Space Features. To demonstrate the advantages of using BEV and PV features together, we compare the model equipped with our proposed duo space object queries to two baselines where object queries solely attend to either BEV or PV features. As shown in Table 5, using features from both spaces leads to a 0.4% gain in mAP from the PV-only baseline and a considerable 2.4% gain in NDS from the BEV-only baseline.

TABLE 5

Ablation of using duo space features.

| Method | w/ BEV | w/ PV | mAP↑ | NDS↑ |
|---|---|---|---|---|
| BEV Only | √ |  | 0.203 | 0.264 |
| PV Only |  | √ | 0.212 | 0.261 |
| Duo (Ours) | √ | √ | 0.216 | 0.288 |

Effectiveness of Feature Divergence Enhancement. To make BEV features more distinctive from PV features, we propose adding feature divergence enhancement during BEV feature generation. As shown in Table 6, while adding it in BEV-only baseline can improve mAP by 0.7%, it won't yield any help on NDS. Adding feature divergence enhancement in conjunction with our duo space design, however, will significantly improve the mAP by 1.3% and NDS by 0.6%, benefiting from the contrast added between BEV and PV features.

TABLE 6

Ablation of the proposed feature divergence enhancement, dubbed "FDE" in the table header.

| Method | FDE | mAP↑ | NDS↑ |
|---|---|---|---|
| BEV Only | √ | 0.203 | 0.264 |
|  |  | 0.210 | 0.260 |
| Duo (Ours) | √ | 0.216 | 0.288 |
|  |  | 0.229 | 0.294 |

Effectiveness of Duo Space Queries. Although using feature maps from both spaces inherently has advantages over using features from a single space, optimal performance cannot be achieved without our delicately designed duo space object query. To validate this, three models differing only in their decoders were obtained. The first model, "unshared pose & unshared content", divides classical object queries into two sets, each attending separately to either BEV or PV features in cross-attention layers. The second model, "shared pose & shared content", makes each classical object query sequentially pass through self-attention, PV and BEV cross-attention layers, thus sharing pose and content embedding across both spaces. The third model, "shared pose & unshared content", is equipped with our proposed duo space object query. As Table 7 reveals, the first setting even hurts the performance compared to the BEV-only model. The performance is marginally improved when pose and content embeddings are both shared, while the best results are achieved coupled with our Duo Space Decoder design. In conclusion, it is important to decouple content embeddings in order to preserve feature representations from both spaces.

TABLE 7

| Ablation of the proposed Duo Space Queries. | | | |
|---|---|---|---|
| Shared Pose | Shared Content | mAP↑ | NDS↑ |
| | | 0.202 | 0.252 |
| √ | √ | 0.225 | 0.290 |
| √ | | 0.229 | 0.294 |

Effectiveness of Duo Space Temporal Modeling. We demonstrate the necessity of a unified temporal solution for both spaces in contrast to some trivial solutions. We keep using temporal queries in PV space across all experiments. In each experiment, we use a different temporal strategy in BEV space. Specifically, "Recurrent Stacking" refers to infusing temporal information by stacking up temporal BEV features. "Learnable Attention" refers to infusing temporal information by temporal self-attention proposed in BEV-Former. "Temporal Queries" refers to our method where both spaces infuse temporal information into their temporal duo space queries. As clearly shown in Table 8, temporal strategy matters a lot. The proposed Duo Space Temporal Modeling achieves far superior performance compared with simply using an off-the-shelf popular BEV temporal method in our duo space paradigm.

TABLE 8

| Ablation of different temporal strategies. | | |
|---|---|---|
| BEV Temporal Method | mAP↑ | NDS↑ |
| Recurrent Stacking | 0.236 | 0.337 |
| Learnable Attention | 0.243 | 0.340 |
| Temporal Queries | 0.266 | 0.385 |

14. CONCLUDING REMARKS

It will be appreciated by one of skill in the art that the present document discloses a unified image object detection technique for a sparse-dense combined BEV detection and segmentation method. It will be appreciated that the technique is adaptable to fusing any combination of 2D and 3D methods and may include different number of branches (e.g., different parallel decision process), modules, tasks and modalities of input images. It will further be appreciated that detection improvements may be obtained in some implementations by adding an enhancement layer that further enhances the 3D features obtained from PV images. In general, any global convolutional/attention mechanism may ne used along with any transformation method for 2D to 3D conversion.

It will further be appreciated by one of skill in the art that the present document discloses generation and use of hybrid detection proposals that use anchor points across 2D and 3D feature maps and specific content from 2D/3D or sparse/dense feature maps.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. In some implementations, however, a computer may not need such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of detecting objects in sensor data, comprising:
   performing, using images obtained from one or more sensors onboard a vehicle, a 2-dimensional (2D) feature extraction;
   performing, a 3-dimensional (3D) feature extraction on the images;
   detecting objects in the images by fusing detection results from the 2D feature extraction and the 3D feature extraction;
   refining 3D feature estimates using dual-space object queries that include joint proposals formed based on 2D features resulting from the 2D feature extraction and 3D features resulting from the 3D feature extraction;
   wherein the refining comprises performing a multi-level refinement wherein, at each layer of the multi-level refinement, a self-attention layer that acts on both the 2D features and the 3D features, a first cross-attention layer that acts only on the 2D features, and a second cross-attention layer that acts only on the 3D features are used.

2. The method of claim 1, wherein the 2D feature extraction comprises a perspective view (PV) analysis of the images.

3. The method of claim 1, wherein the 3D feature extraction comprises a bird's eye view (BEV) analysis of the images.

4. The method of any claim 1, wherein the 3D feature extraction is performed by:
   generating 3D features from the 2D features resulting from the 2D feature extraction.

5. The method of claim 4, wherein the generating the 3D features from the 2D features comprises applying a back-projection model to the 2D features.

6. The method of claim 4, wherein a shared pose is further used during the refining.

7. The method of claim 1, wherein the 2D feature extraction comprises a 3D object detection method.

8. An apparatus for detecting objects in images from sensor data, the apparatus comprising at least one processor configured to:
   perform, from the sensor data, a 2-dimensional (2D) feature extraction;
   perform, from the sensor data, a 3-dimensional (3D) feature extraction;
   detect the objects in the images by fusing detection results from the 2D feature extraction and the 3D feature extraction;
   refine 3D feature estimates using dual-space object queries that include joint proposals formed based on 2D features resulting from the 2D feature extraction and 3D features resulting from the 3D feature extraction;
   wherein the refining comprises performing a multi-level refinement wherein, at each layer of the multi-level refinement, a self-attention layer that acts on both the 2D features and the 3D features, a first cross-attention layer that acts only on the 2D features, and a second cross-attention layer that acts only on the 3D features are used.

9. The apparatus of claim 8, wherein the 2D feature extraction comprises a perspective view (PV) analysis of the images and the 3D feature extraction comprises a bird's eye view (BEV) analysis of the images.

10. The apparatus of claim 8, wherein the at least one processor performs the 3D feature extraction by:
   generating 3D features from the 2D features resulting from the 2D feature extraction.

11. The apparatus of claim 10, wherein the generating the 3D features from the 2D features comprises applying a back-projection model to the 2D features.

12. The apparatus of claim 10, wherein the refining is performed using a Conv3D or a Conv2D algorithm.

13. The apparatus of claim 8, wherein the 2D feature extraction comprises a 3D object detection method.

14. The apparatus of claim 8, wherein the 3D feature extraction comprises a dense segmentation and/or a detection method.

15. A system for deployment on an autonomous vehicle, comprising:
   one or more sensors configured to generate sensor data of an environment of the autonomous vehicle; and
   at least one processor configured to detect objects in the sensor data by:
   performing, using images from the sensor data obtained from the one or more sensors, a 2-dimensional (2D) feature extraction;
   performing a 3-dimensional (3D) feature extraction on the sensor data;

detecting objects in the images by fusing detection results from the 2D feature extraction and the 3D feature extraction;

refining 3D feature estimates using dual-space object queries that include joint proposals formed based on 2D features resulting from the 2D feature extraction and 3D features resulting from the 3D feature extraction;

wherein the refining comprises performing a multi-level refinement wherein, at each layer of the multi-level refinement, a self-attention layer that acts on both the 2D features and the 3D features, a first cross-attention layer that acts only on the 2D features, and a second cross-attention layer that acts only on the 3D features are used.

16. The system of claim 15, wherein the one or more processor performs the 3D feature extraction by:

generating 3D features from the 2D features resulting from the 2D feature extraction.

17. The system of claim 15, wherein hybrid detection proposals are used for querying for the objects.

18. The system of claim 15, wherein the one or more sensors include a camera and a lidar.

\* \* \* \* \*